United States Patent
Terasawa et al.

(10) Patent No.: US 8,311,054 B2
(45) Date of Patent: Nov. 13, 2012

(54) TRANSMITTING/RECEIVING SYSTEM, NODE AND COMMUNICATION METHOD

(75) Inventors: Takuya Terasawa, Yokohama (JP); Takashi Arai, Yokohama (JP); Shunichi Ko, Yokohama (JP); Koichi Mita, Yokohama (JP); Akira Shimamura, Yokohama (JP); Koji Mikami, Shinjuku (JP); Naoya Komada, Yamato (JP)

(73) Assignee: Fujitsu Semiconductor Limited, Yokohama (JP)

( * ) Notice: Subject to any disclaimer, the term of this patent is extended or adjusted under 35 U.S.C. 154(b) by 137 days.

(21) Appl. No.: 12/410,086

(22) Filed: Mar. 24, 2009

(65) Prior Publication Data

US 2009/0213870 A1    Aug. 27, 2009

Related U.S. Application Data

(63) Continuation of application No. PCT/JP2006/319419, filed on Sep. 29, 2006.

(51) Int. Cl.
*H04B 7/212* (2006.01)

(52) U.S. Cl. ........ 370/442; 370/458; 370/470; 370/472; 370/474; 370/475; 370/476; 370/498

(58) Field of Classification Search .................. None
See application file for complete search history.

(56) References Cited

U.S. PATENT DOCUMENTS

| | | | | |
|---|---|---|---|---|
| 6,157,656 | A | * | 12/2000 | Lindgren et al. ............... 370/458 |
| 7,009,996 | B1 | | 3/2006 | Eddy et al. |
| 2006/0045133 | A1 | | 3/2006 | Temple et al. |
| 2006/0088048 | A1 | * | 4/2006 | Bahl ............................ 370/458 |
| 2007/0133612 | A1 | * | 6/2007 | Hatanaka ...................... 370/503 |

FOREIGN PATENT DOCUMENTS

| | | |
|---|---|---|
| JP | 11-514812 A | 12/1999 |
| JP | 2003-500960 A | 1/2003 |
| JP | 2005-328119 A | 11/2005 |
| JP | 2006-509388 A | 3/2006 |
| JP | 2006-253922 A | 9/2006 |

OTHER PUBLICATIONS

"FlexRay Communications System Electrical Physical Layer Conformance Test Specification"; Version 2.1; Revision A.
"FlexRay Communications System Protocol Specification" Version 2.1 Revision A; Dec. 22, 2005.

* cited by examiner

*Primary Examiner* — Kibrom T Hailu
(74) *Attorney, Agent, or Firm* — Fujitsu Patent Center

(57) ABSTRACT

A transmitting/receiving system includes a control field controlling a transmitting priority of a dynamic slot is included in each communication cycle, and a node of the transmitting/receiving system sets control information including a preferential usage request for a dynamic slot that the node transmits in the control field and notifies all nodes in the transmitting/receiving system of the preferential usage request for the dynamic slot.

20 Claims, 21 Drawing Sheets

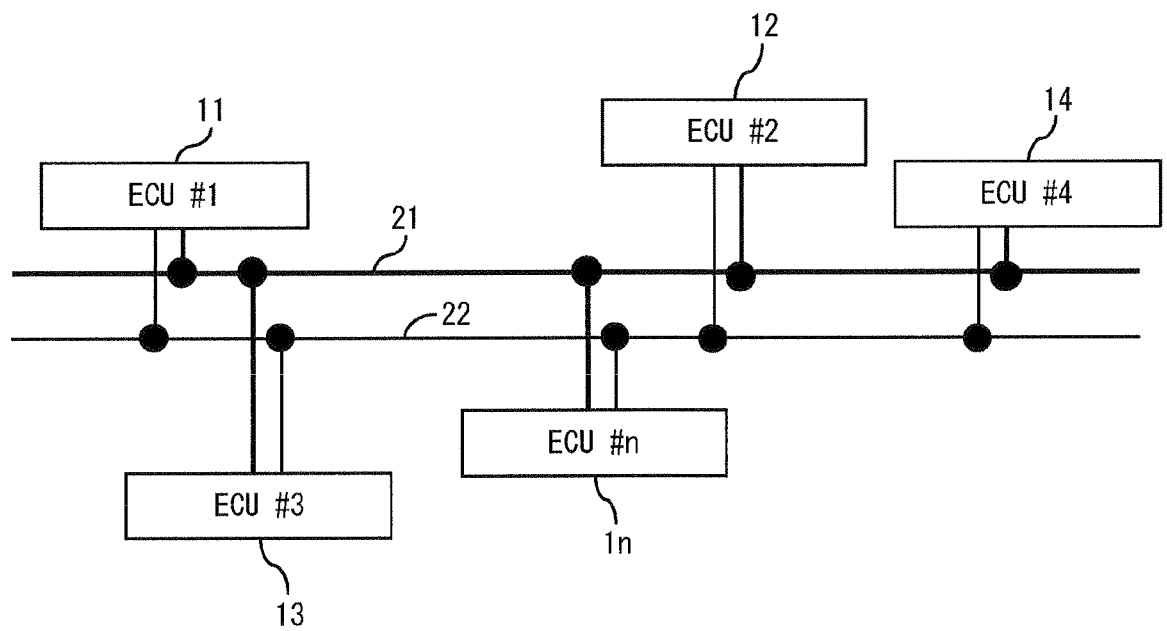
F I G. 1

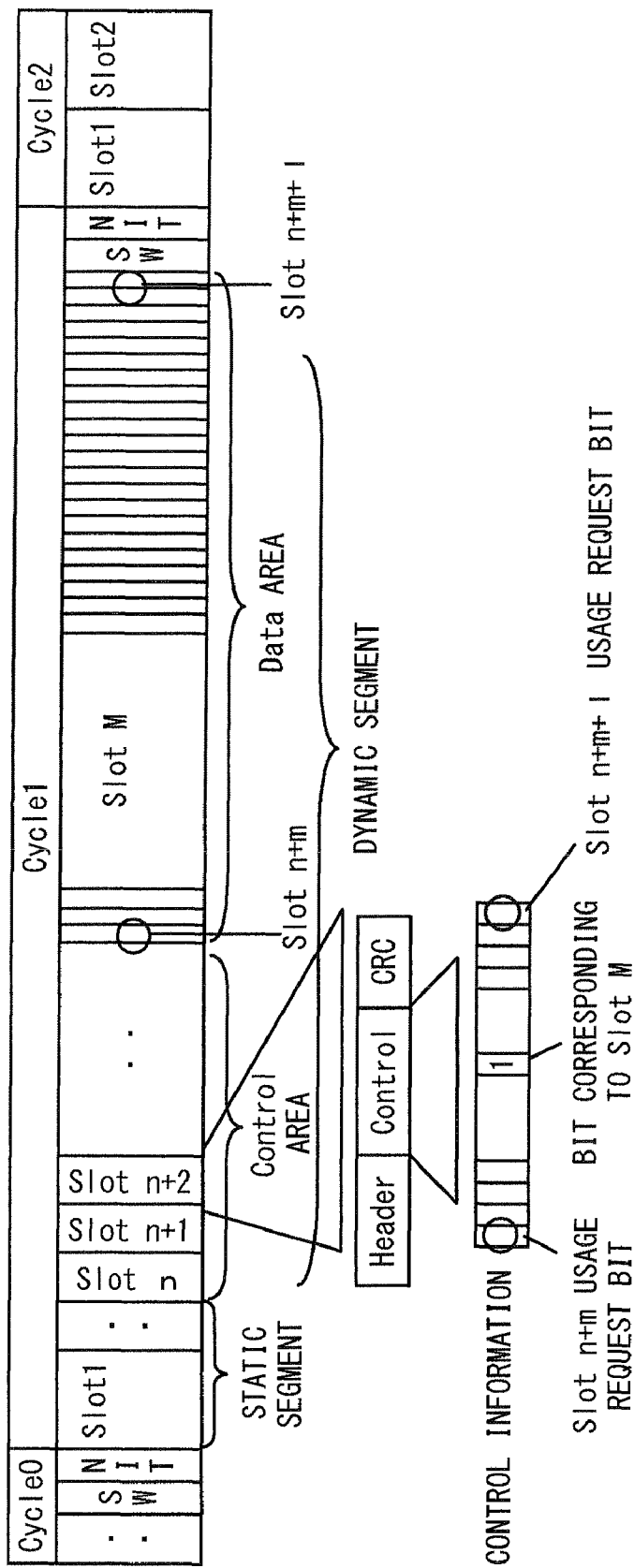
F I G. 7

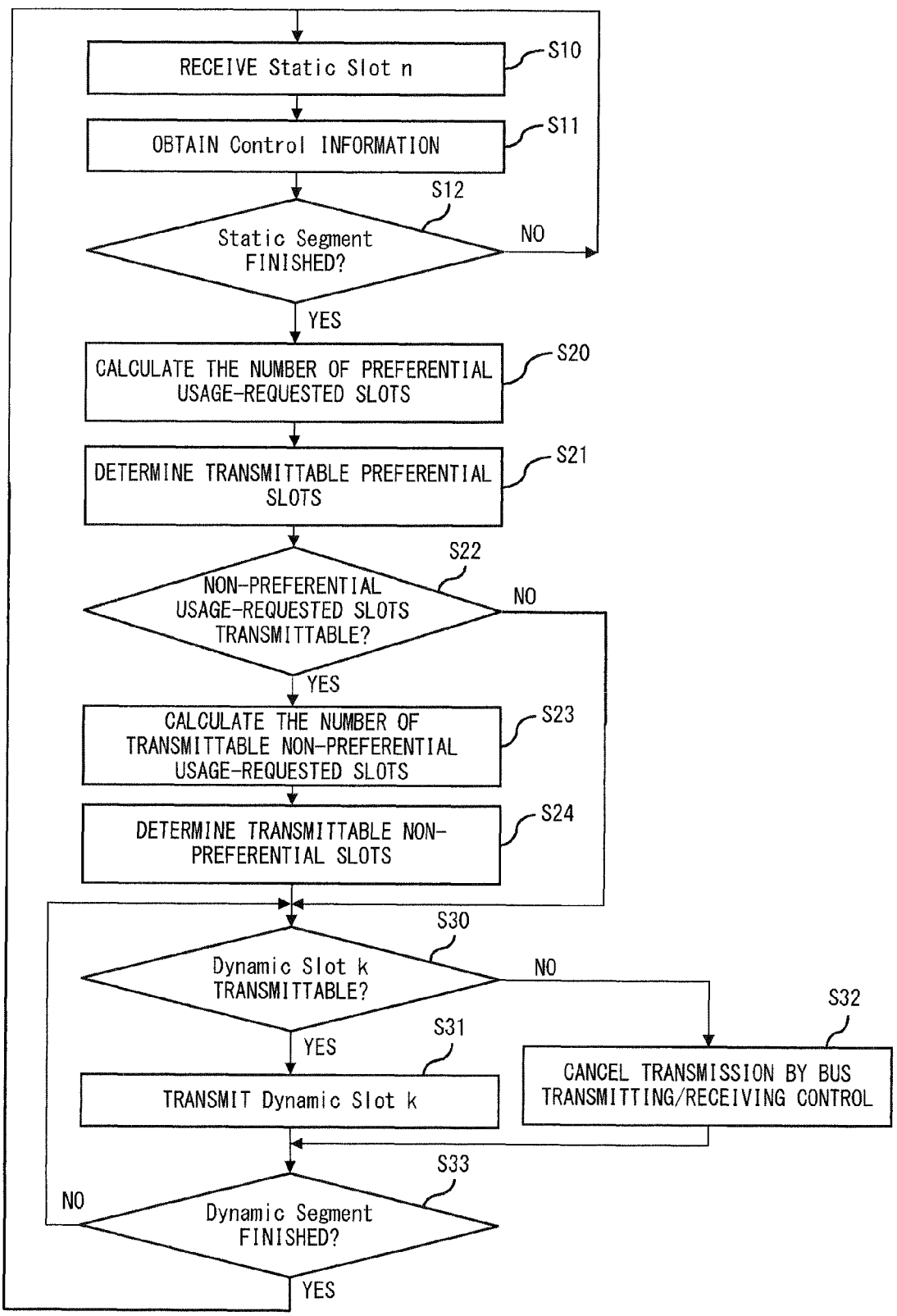
F I G. 1 2

TRANSMITTING/RECEIVING SYSTEM, NODE AND COMMUNICATION METHOD

FIELD

The present embodiments discussed herein are related to a system communication.

BACKGROUND

As to a recent automobile, ecology, space saving and safety have been asked for and the realization of high-speed transmission, real-time processing and high reliability as well as a fine control are required.

In order to satisfy these requirements, the electronic control of each module of an automobile has been promoted and a plurality of electronic control units (ECUs) are mounted on each automobile. The ECUs constitute a network and each piece of control information is exchanged by communications between the ECU.

In communication protocol, such as a controller area network (CAN) currently used for these communications between ECU, there is a problem of insufficient capability, although the above-described requirements are increasing. Therefore, as a communication method that is highly reliable and capable of realizing high-degree control, FlexRay being a next generation communication method is focused.

As an example, FlexRay being one of TDMA methods featured by a flexible segment structure comprising a fixed area and a variable area is described below. However, the communication method is not limited to this.

FlexRay is a time-trigger method (in other words, a TDMA method). In FlexRay, a certain time (communication cycle) is divided into slots and a node assigned to each slot transmits a frame. Therefore, data may be surely transferred according to a given schedule. Therefore, compared with an event trigger method (for example, CAN) in which a node issues a communication request in accordance with the occurrence of an event or the like, the real-time processing of data communications is improved and reliability is also improved by using two communication paths.

Figure 1:
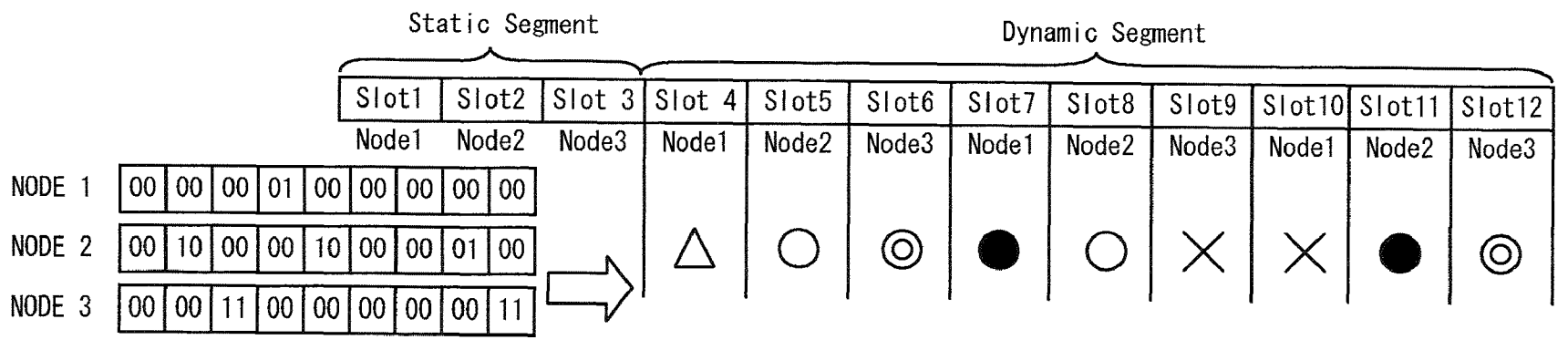

FIG. 1 illustrates an example network configuration of a cluster comprising a plurality of nodes adopting FlexRay. In FIG. 1, ECU#1 (11), ECU#2 (12), ECU#3 (13), ECU#4 (14), . . . and ECU#n (1n) are connected to each other by a channel A bus (21) and a channel B bus (22).

FIG. 2 explains a communication cycle and a segment/slot structure in FlexRay.

As illustrated in FIG. 2, the communication schedule of FlexRay comprises communication cycles for repeatedly counting 0 through 63 using 6 bits, a segment for managing a time division multiple access (TDMA) in one of the communication cycles and slots. The segment is divided into a static segment and a dynamic segment.

The number of slots of the static segment is 2 through 1,023 and a slot ID is attached across from the static slot of the static segment to the dynamic slot of the dynamic segment. The maximum value of the slot ID is 2,047. Although the static slot has a fixed length, the dynamic slot is formed by collecting several mini-slots and has variable length.

In FIG. 2, a static slot whose ID is 2 is assigned to ECU#2 and comprises an idle portion which transmits no data, a static frame for ECU#2 and an idle portion. A dynamic slot whose ID is 51 is assigned to ECU#n and comprises an idle portion, a dynamic frame for ECU#n and an idle portion. The last end of a communication cycle is assigned to a symbol window SW being a fixed-length time slot for transmitting a special symbol and a network idle time NIT being no communication period, during which the communication controller of each node performs several operation processes.

As illustrated in FIG. 2, the assignment of a static slot to each ECU in the communication cycle 2 is the similar as in the communication cycle 1, and slots 1 and 2 are assigned to ECU#1 and #2, respectively.

FIG. 3 explains the transmitting process of a static segment. The slot counters for channels A and B are initialized at the head of a communication cycle and monitor the current slot position. Then, when the frame ID used by a local ECU and a static slot number are matched, a frame is transmitted. Although the slot counter of each channel is separately controlled during the static segment period, their count values may be the same.

As described earlier, the size of each slot of the static segment is fixed and takes a value in the range of 4 to 659 MT in units of macrotic (MT) of the similar length (time) in a cluster. Transmitting/receiving of a frame in the slot is assured each time in each communication cycle.

FIG. 4 explains the transmitting process of a dynamic segment. A dynamic segment has a transfer area of variable-length slot comprising mini-slots each of which occupies a time area being a minimum unit smaller than a slot. Therefore, a dynamic segment may transmit/receive a variable-length frame. The length of a mini-slot is in the range of 2 to 63 MT and its number is in the range of 0 to 7,986.

As exemplified in FIG. 4, if the last slot ID of a static segment is 50, a slot counter takes over the counter value and both the values m of the slot counters for channels A and B are 51 (m=51). Then, in the dynamic segment, the slot counter monitors the current mini-slot position.

The slot counter individually operates for each channel. In FIG. 4, in channel A, a frame is transmitted when the slot counter value is m and the slot counter value is m during the period. However, in channel B, the counter value counts up from m to m+1 to m+2 during the period and at m+3, a frame of frame ID m+3 is transferred. In an area where no frame is transferred, the value of the slot counter is incremented every mini-slot.

Since slots of a dynamic segment is transmitted giving priority to the slot of the smaller number, the larger is the slot ID number, the lower becomes its transmitting priority in a conventional dynamic segment. Therefore, if in a dynamic segment, a frame of a large data size is transmitted having a small slot number, the frame transmitting time of slots after that becomes insufficient and sometimes all the frames may not be transmitted.

FIG. 5 explains constraints in a dynamic segment.

As to a dynamic segment, a parameter called pLatestTx for determining whether the last end in which a frame may be transferred is reached after sequentially transferring frames is used. Although this parameter may take a value in the range of 0-7, 981 mini-slots, it is used to determine in such a way that a longest dynamic frame may be transmitted last. The longest dynamic frame is the total length of a header, a payload and a trailer and is 262 bytes.

Dynamic frames are sequentially transmitted, lastly the mini-slot time area up to pLatestTx is transmitted and the transmission of a new slot is prohibited. Therefore, if preferential frames using smaller slot ID numbers are transmitted up to pLatestTx, non-preferential frames may not be transmitted in the current cycle.

Therefore, when there is no need to give priority, priority by ID is given by necessity and a difference in the frequency of transmission completion is generated by an assigned ID number in the transmission of slots essentially with the similar priority.

For example, although in a gateway system for connecting a FlexRay transmission path and a transmission path by another protocol, there is no difference in priority in the gateway of output queue on the FlexRay side, when a dynamic slot for transmission output is assigned for each output queue on the FlexRay side, sometimes there may occur a difference in the transmission amount of messages between queues essentially with the similar priority due to a difference in priority by the assignment of a slot ID.

A specification document of the above described FlexRay may be downloaded by accessing the home page of the "FlexRay Communication System Protocol Specification" ver. 2.1 Rev. A (Dec. 22, 2005) (http://www.flexray.com/index.php).

The Laid-open Japanese Translation of PCT International Patent Application Publication No. H11-514812 discusses a technology for dynamically changing the capacity of a control channel or a data channel in a communication method adopting a trigger method as in FlexRay.

The Japanese Laid-open Patent Publication No. 2005-328119 discusses a communication message conversion device for converting a message in CAN transmission path and a message in FlexRay transmission path to each other.

As described above, in a typical network adopting FlexRay, a static slot is uniformly transmitted from each node, as to a dynamic slot there is inequality in a transmission chance that a dynamic slot of a larger ID number assigned is seldom transmitted and one having a smaller ID number is often transmitted.

For example, in the protocol specification of FlexRay, when the band of a dynamic segment runs short, frames may not be transmitted in the current cycle and frame transmission is postponed to a subsequent communication cycle. When a great number of frames having smaller slot numbers or a long frame is transmitted, there is a high possibility that dynamic segment time always runs short and a frame of a larger slot number may be hardly transmitted.

However, sometimes it is used for even a non-preferential node due to a large slot number to transmit a frame in the current communication cycle.

SUMMARY

According to an aspect of the embodiments, a transmitting/receiving system includes a control field controlling a transmitting priority of a dynamic slot is included in each communication cycle, and a node of the transmitting/receiving system sets control information including a preferential usage request for a dynamic slot that the node transmits in the control field and notifies all nodes in the transmitting/receiving system of the preferential usage request for the dynamic slot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an example network configuration adopting FlexRay.

FIG. 7 explains the second structure example of a control field according to the present embodiment.

FIG. 12 explains an example transmitting process flow of a dynamic slot in the case where one-bit priority information is used in the first embodiment.

FIG. 13 explains the example determination of a transmittable dynamic slot in the case where two-bit priority information is used in the first embodiment.

FIG. 16 explains the example determination of transmittable dynamic slots in the case where one-bit priority information is used and priority is determined for each group in the second embodiment.

DESCRIPTION OF EMBODIMENTS

There are some embodiments from various points of view as embodiments.

Firstly, embodiments about how to structure the control field will be explained and then, embodiments about how to determine priority on the basis of control information set in the control field will be explained as the first through third embodiments. Their hardware configurations will be also explained.

Figure 2:
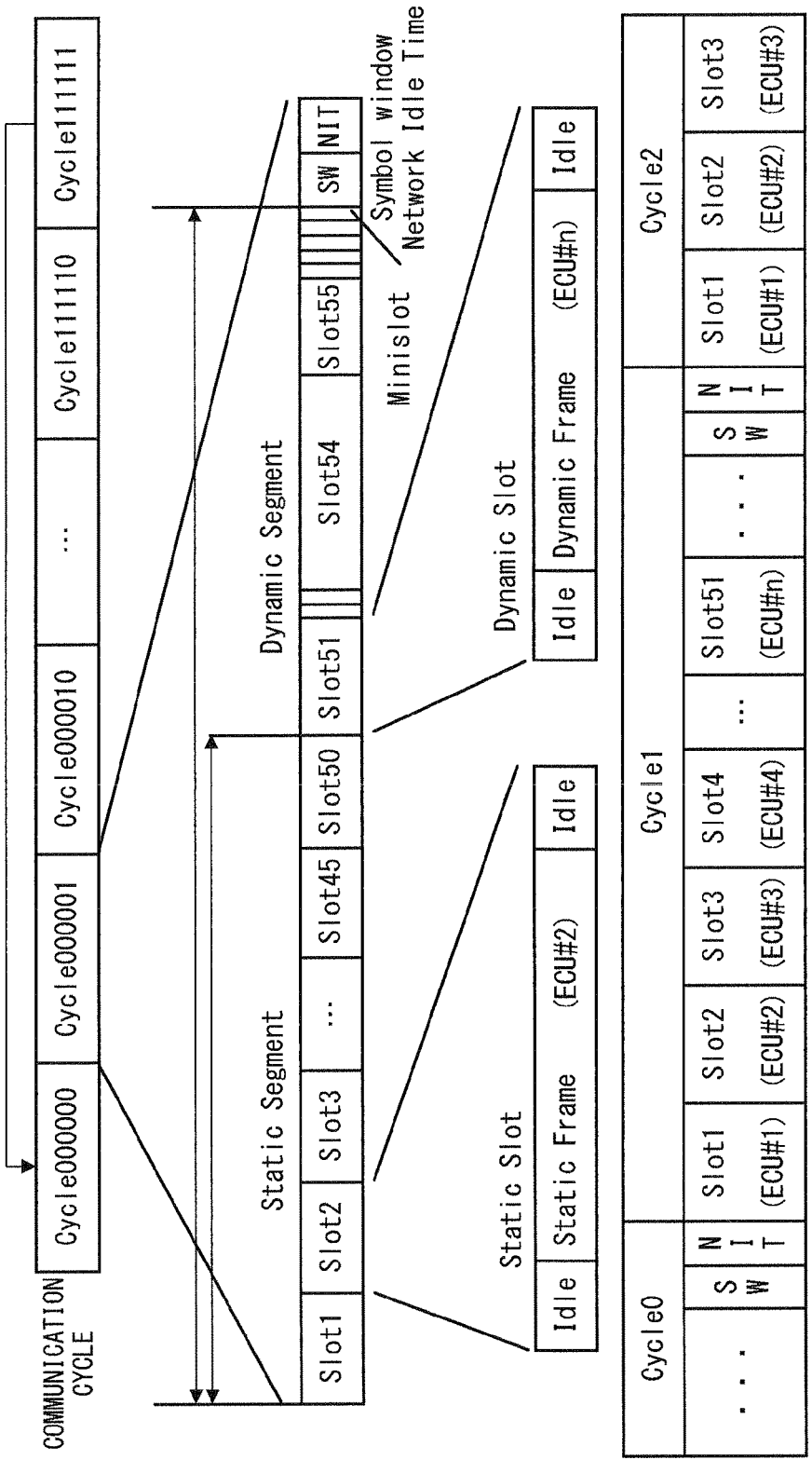
FIG. 2 explains a communication cycle and a segment/slot structure in FlexRay.
Figure 3:
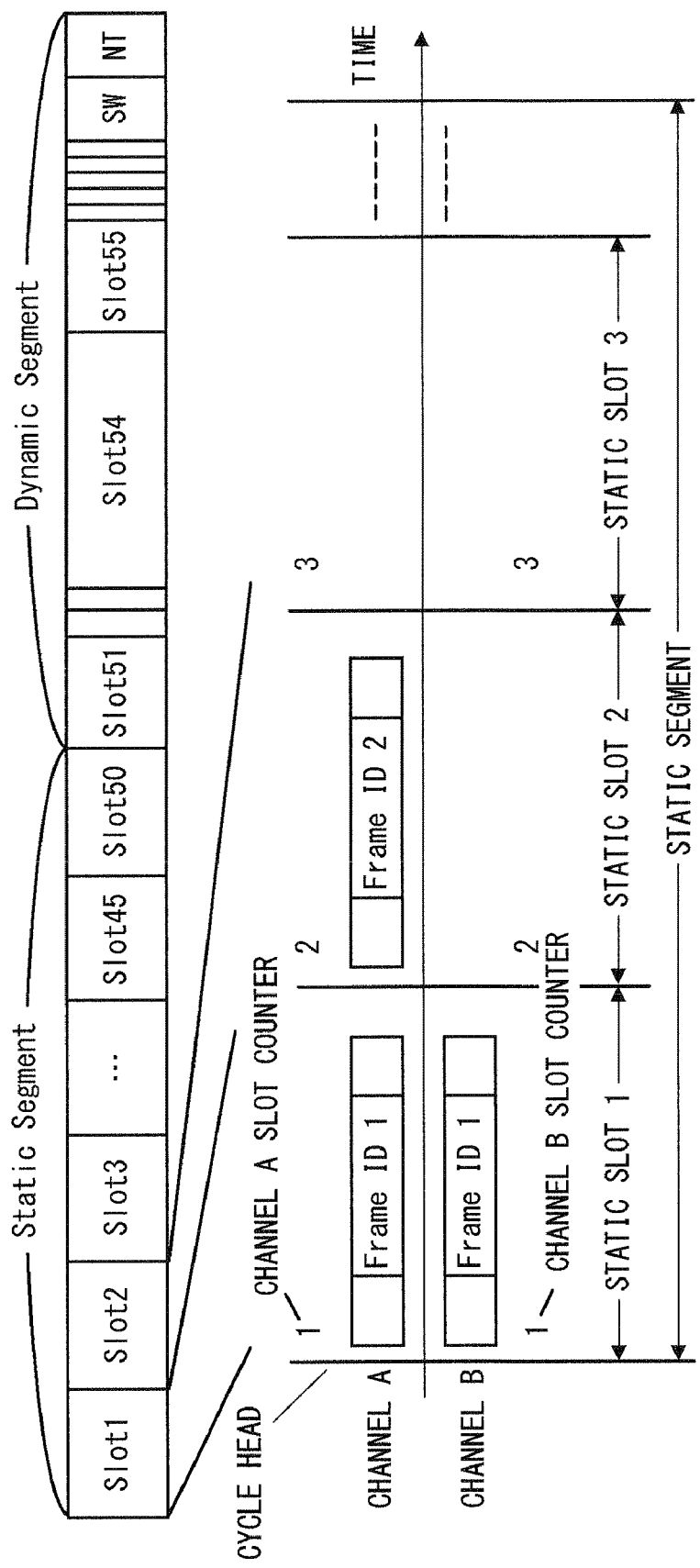
FIG. 3 explains the transmitting process of a static segment.
Figure 4:
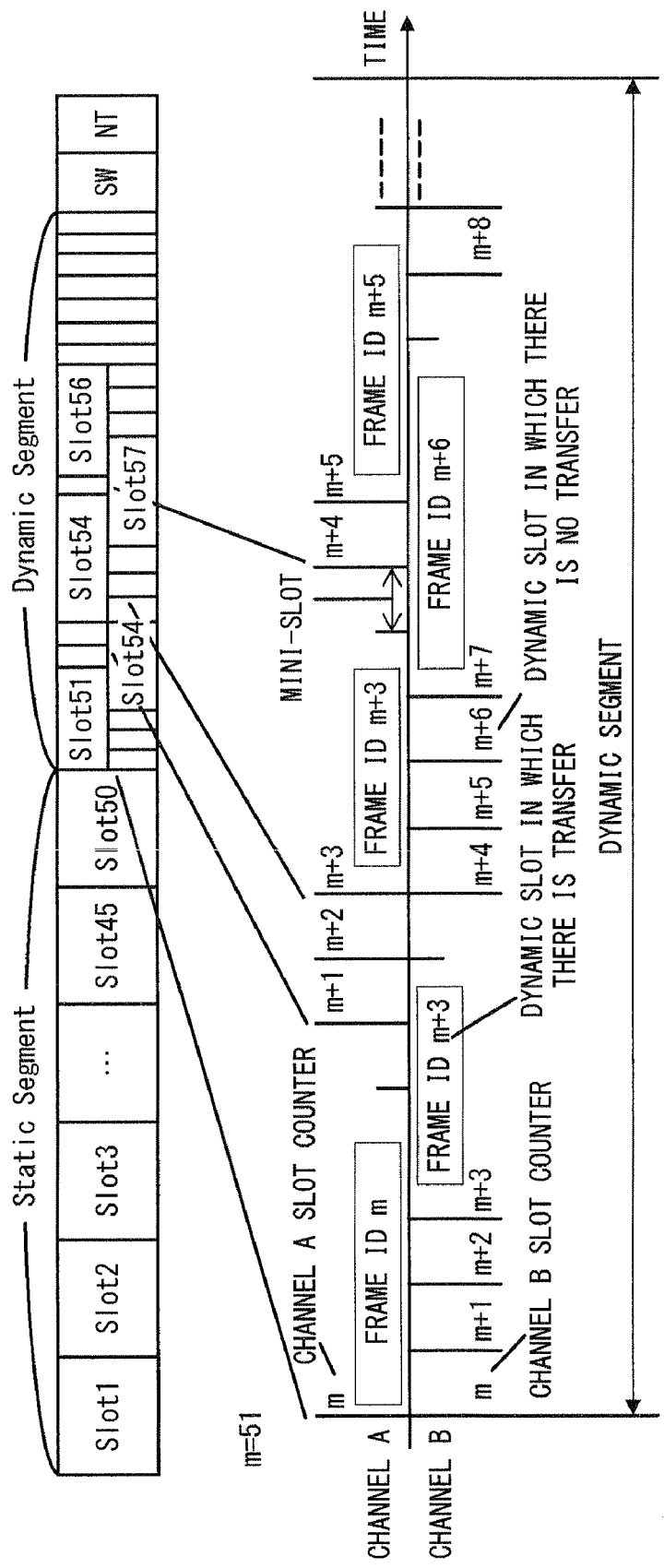
FIG. 4 explains the transmitting process of a dynamic segment.
Figure 5:
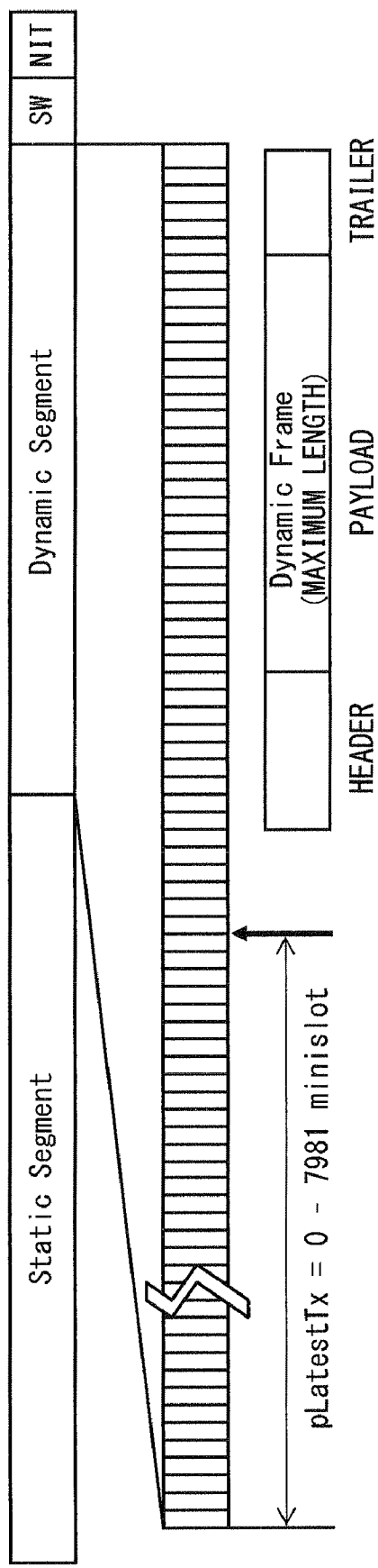
FIG. 5 explains constraints in a dynamic segment.
Figure 6:
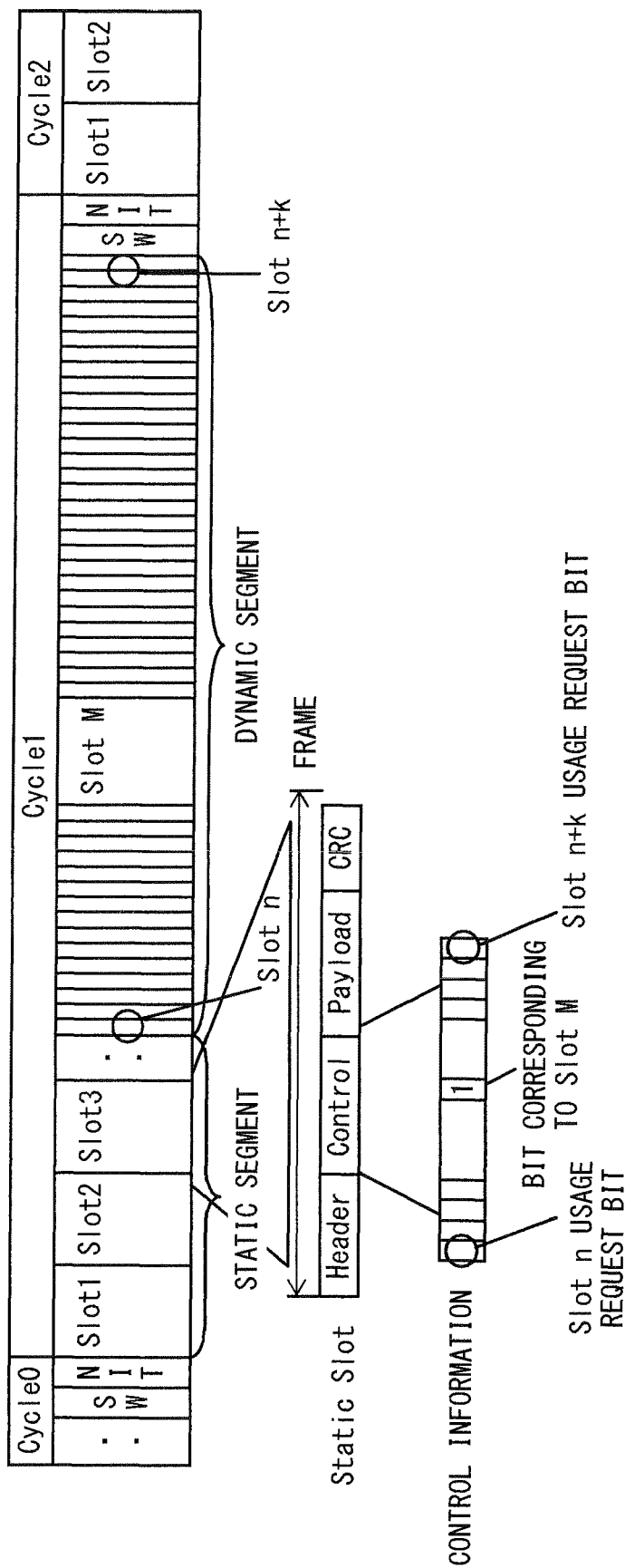
FIG. 6 explains the first structure example of a control field according to the present embodiment.

FIG. 6 explains the first structure example of a control field according to the present embodiment. As clear from the slot 3 of a static segment enlarged and illustrated in FIG. 6, in the first structure example, a dynamic request flag area (control field) is included in the payload portion of a static slot.

By adopting the first structure example of the control field, the transmitting/receiving reliability of control information requesting for preferential usage is improved and the process is made easy since the control information may be obtained before a dynamic segment starts. Therefore, it is effective when it is used to surely transmit the control field each time.

The control information stored in the control field is a group of bit information corresponding to all the used dynamic slots. As illustrated in FIG. 6, if the slot numbers of dynamic slots are n through n+k, the control information of the control field comprises a slot n usage request bit through a slot (n+k) usage request bit. In the illustrated example, the preferential usage of a dynamic slot is requested by setting a bit in a position corresponding to a slot M which a transmitting node assigned to the slot 3 requests to use to 1.

In a static slot receiving process, each node checks the control information of each static slot. If there is a preferential usage request for a dynamic slot after a dynamic slot assigned to the node itself and the transmitting band of a slot whose preferential usage is requested runs short due to the transmission of the node, the transmission of a frame using a dynamic slot assigned to the node is cancelled.

A dynamic slot being the control target of a preferential usage request may be made in the similar communication cycle. Alternatively, it may be made a dynamic slot in a subsequent communication cycle.

FIG. 7 explains the second structure example of a control field according to the present embodiment. In the second structure example, the control field is set in a dynamic segment. In this case, the dynamic segment is divided into a control information slot area and a data slot area. One information control slot is assigned to each node.

Since the slot length, frame length and payload length of a static segment are fixed and when the size of some of the frames becomes large, it affects all the static slots. Therefore, if the first structure example of the control field is adopted, there is a possibility that the band of the entire static segment may become unnecessarily large. In that case, by adopting the second structure example of the control field and moving control information to a dynamic segment, the band of a static segment may be minimized.

If a control field is transmitted in a static slot as in the first structure example when there is no need to surely transmit a control field each time, for example, a control field is transmitted as requested, its overhead becomes large.

However, since as to a dynamic segment area, there is no need to transmit a frame if not used, there is no need to transmit a preferential usage request frame if there is no preferential usage request. Therefore, a band may be efficiently used.

As the slot (n+2) of a dynamic segment is enlarged and illustrated in FIG. 7, a control information dynamic slot in the second structure example comprises a header portion, a control field and a CRC check trailer portion. As illustrated, if the slot numbers of a dynamic slot in a data area are (n+m) through (n+m+1), the control field comprises slot (n+m) usage request bit through slot (n+m+1) usage request bit. In the illustrated example, the preferential usage of a dynamic slot is request by setting a bit in a position corresponding to a slot M which a transmitting node assigned to the slot (n+2) requests to use to 1.

Only when requesting for the preferential usage of a dynamic slot, each node transmits preferential usage request information in a control information slot.

As the transmitting method of request information, a method for specifying the ID of a dynamic slot may be considered besides a method by a bit position corresponding to a dynamic slot as illustrated. However, in FlexRay, one node may transmit the frames in a plurality of dynamic slots.

Therefore, when determining the transmitting method of preferential usage request information, it is used to consider a case where one node requests a plurality of dynamic slots to transmit frames. Then, as illustrated in FIGS. 6 and 7, a method for providing preferential usage request information (control bit) for each of all the dynamic slots whose preferential usage may be requested is effective when the preferential usage request information of a plurality of dynamic slots are simultaneously transmitted.

By providing a control bit for each dynamic slot, a slot whose preferential usage is requested in a dynamic segment in the current or a subsequent communication cycle may be clarified and a band may be assigned in a dynamic segment time according to priority.

Since the format of preferential usage information corresponds to all the pre-determined dynamic slots, all the transmitting nodes in a cluster may set their preferential usage information in the similar format, the processing methods of all the receiving nodes may be unified and the similar determination results may be obtained. One node may also transmit preferential usage request information for a plurality of slots.

Furthermore, if the bandwidth of all the transmittable dynamic slots is constant, transmittable slots may be determined only by the number of preferential usage requests. Therefore, the determination method is easy.

As described later, by using a plurality of bits as the control bit for one slot, priority levels may be set and fine control may become possible.

In the control information slot receiving process of each node for preferential usage request information transmitted as described above, each node checks control information. If there is a preferential usage request for a dynamic slot assigned to the node itself or a dynamic slot thereafter and the transmitting band of a slot whose preferential usage is requested runs short by the node transmitting, the transmission of a frame using the dynamic slot assigned to the node is cancelled.

Even when the second structure example is adopted, as when the first structure example is adopted, a dynamic slot being the control target of a preferential usage request can be transmitted in the similar communication cycle. Alternatively, it can be transmitted in a subsequent communication cycle.

Next, a hardware configuration for implementing the present embodiment is described.

Figure 8A:
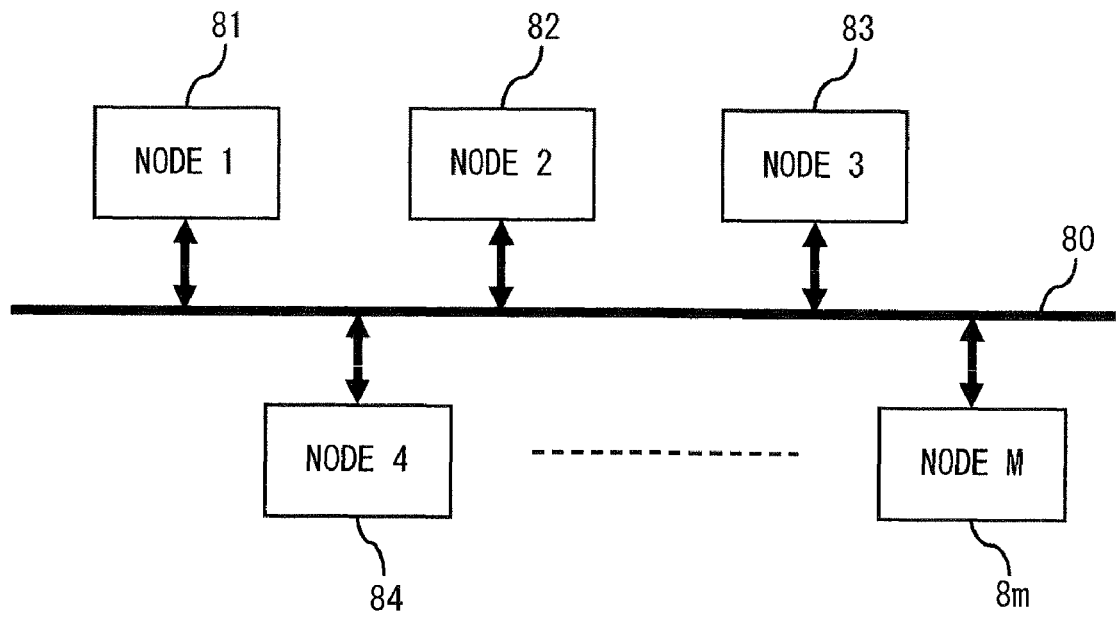
FIG. 8A illustrates an example cluster structure by bus connection.

FIG. 8A illustrates an example cluster structure by bus connection. In FIG. 8A, nodes 1 (81), 2 (82), 3 (83), 4 (84), . . . and M (8*m*) are connected by a bus (80) and constitute a cluster being a transmitting/receiving system.

Figure 8B:
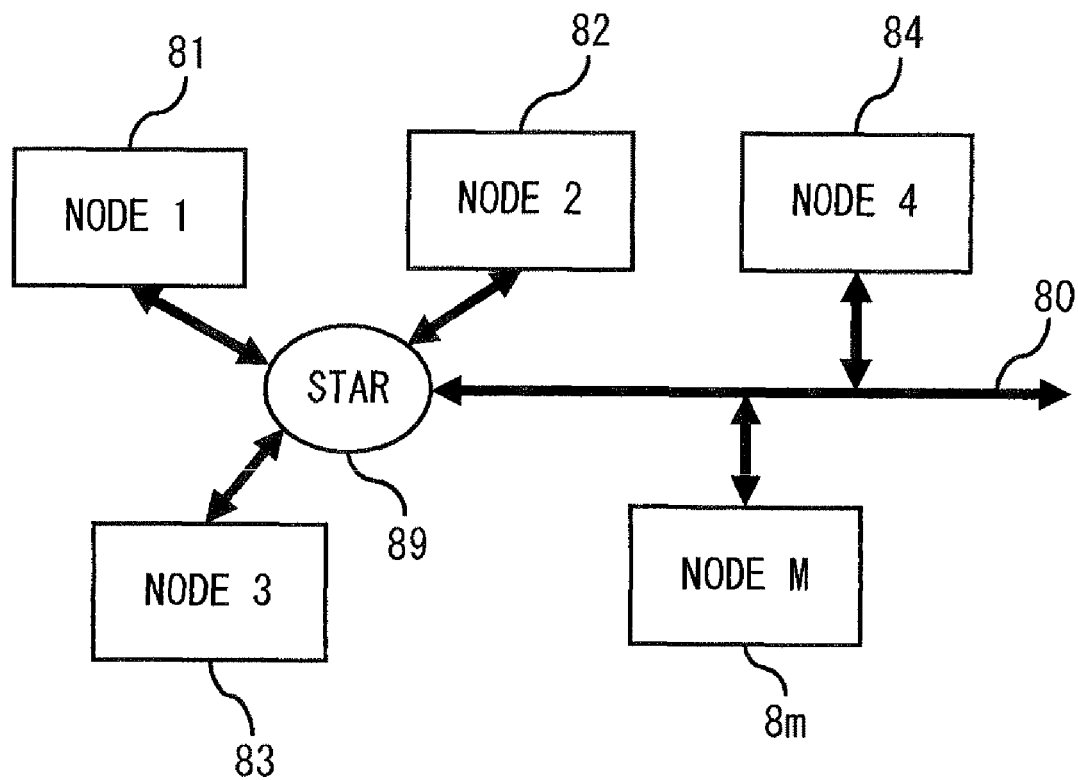
FIG. 8B illustrates an example cluster structure in which a star connection and a bus connection are mixed.

FIG. 8B illustrates an example cluster structure in which a star connection and a bus connection are mixed. In FIG. 8B, nodes 1 (81), 2 (82) and 3 (83) are connected by a star coupler (89) and nodes 4 (84), . . . and M (8*m*) are connected by a bus (80), which constitute a cluster as a whole.

Naturally, they can also constitute a cluster only by a star connection. The above-described cluster configuration itself is the similar as the conventional one. Although each of the bus and the star is indicated by a piece of line, as described earlier, it is physically composed of two pieces of transmission paths.

Figure 9:
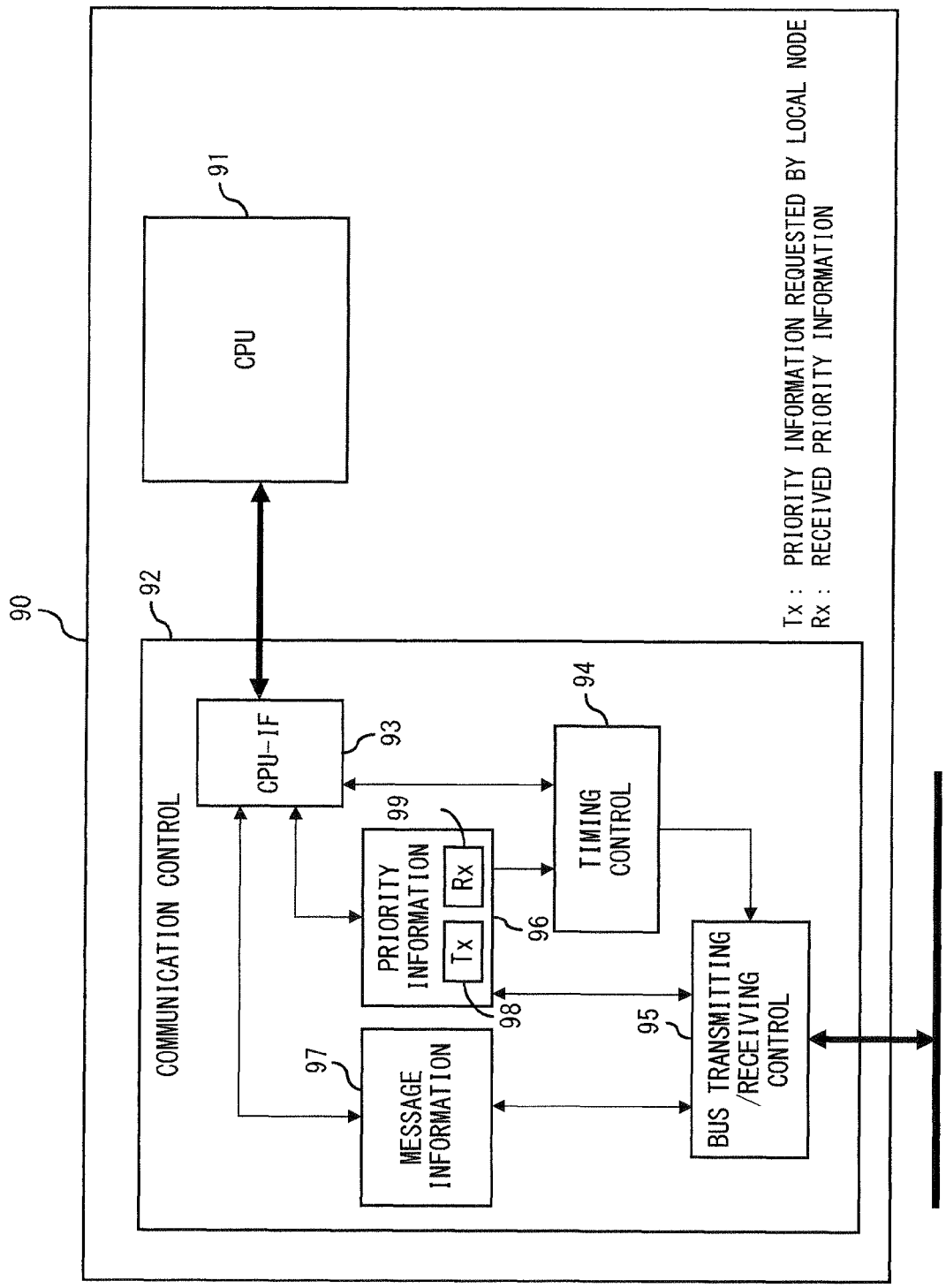
FIG. 9 explains a node structure example according to the present embodiment.

FIG. 9 explains a node structure example according to the present embodiment. A node (90) comprises a CPU (91) for processing and controlling transmitting/receiving data and a communication control unit (92) for controlling communications with another node via a bus.

The communication control unit (92) comprises a CPU-IF unit (93) for providing an interface with the CPU (91), a timing control unit (94) for controlling the timing of a time trigger, a bus transmitting/receiving control unit (95) for controlling the transmission/reception of data with the bus, a priority information unit (96) for storing priority information and a message information unit (97) for storing transmitting/receiving message.

The CPU (91) sets data to transmit in this message information unit (97). The transmitting/receiving data is read from this message information unit (97).

The bus transmitting/receiving control unit (95) transmits and receives frames according to the information of the timing control unit (94). It also assembles and disassembles frame formats.

When transmitting a frame, transmitting data is moved from the message information unit (97) according to an instruction from the timing control unit (94) and its transmission to a bus is controlled. If there is priority information to transmit, it is applied to an information field and is transmitted.

When receiving a frame from a bus, the received data is stored in the message information unit (97). The information about a preferential usage request is stored in the priority information unit (96).

The timing control unit (94) controls the timing of a time trigger (TDMA in other words). For example, when it is the turn of the transmitting slot of the local node, it instructs the bus transmitting/receiving control unit (95) to issue a bus transmitting request. The priority of bus transmitting timing is controlled according to the priority information of the priority information unit (96). Alternatively, the bus transmitting timing is controlled by a transmitting instruction from the CPU (91).

The priority information unit (96) comprises a Tx register (98) being a register for storing local node (transmitting) priority information and a register group (Rx register (99)) for storing priority information from other nodes for each control unit.

Each of these registers has as many fields as the number of slots whose priority is controlled. When the local node sets priority information, the CPU (91) sets priority information in the corresponding field of the Tx register (98) via the CPU-IF unit (93), which constitutes payload data together with message information and is transmitted from the bus transmitting/receiving control unit (95) to a bus at the timing of the transmitting slot of the node.

Preferential usage information from another node is stored in the Rx register (99) as the logical OR of preferential usage information from respective receiving slots for each control unit.

For example, if received preferential usage information from slots 1 and 2 are "00010" and "00100", respectively, when there are slots 1 and 2 being the similar control unit, information stored in the Rx register (99) becomes "00110".

When all the preferential usage information in the similar communication cycle is stored for each control unit for determining priority control, priority control calculation is performed. Then, information used for timing control is reported to the timing control unit (94).

As a processing method for the priority control calculation, there are two methods of a hardware process of providing an operation processing unit in the priority information unit (96) and a software process in which the CPU (91) obtains priority information via the CPU-IF unit (93) and performs calculation.

The summary of each process example is described below.

In the case of the hardware process, a priority process is calculated by the operation unit in the priority information unit (96) until its transmission of a control target dynamic segment in the similar communication cycle is controlled after all pieces of preferential usage information are obtained. If there is a dynamic slot whose transmission is cancelled by preferential usage as the result of the operation, the operation process result is reported to the timing control unit (94).

The timing control unit (94) cancels the transmission of a dynamic slot according to the operation process result.

Priority information of the Rx register is reset until a subsequent communication cycle is started after the operation process result is reported.

In the case of the software process, after the acquisition of all pieces of preferential usage information, the CPU (91) obtains the priority information of the Rx register, calculates the priority process and notifies the timing control unit (94) of the result via the CPU-IF unit (93).

The timing control unit (94) cancels the transmission of a dynamic slot according to the operation process result.

As a dynamic slot being a control target in this case, either a dynamic slot in the similar communication cycle or a dynamic slot in a subsequent communication cycle may be controlled.

Priority information of the Rx register is reset by the operation of the CPU (91) after the operation process result is reported.

First Embodiment

Next, as the first embodiment, an aspect for determining slots that may be collectively transmitted, of all the dynamic slots in the dynamic segment is described. In the first embodiment, naturally the priority of the entire dynamic segment is collectively determined.

Since the number of transmittable nodes is not one, it is used to consider a case where each of a plurality of nodes issues a preferential usage request for respective transmitting dynamic slots. It is also used to determine priority in one communication cycle in total.

In the determination method in the first embodiment for collectively determining the entire dynamic segment in one communication cycle, since one time of determination is sufficient for each communication cycle, the process is easy. Real-time control by hardware/software may be also possible. When it is difficult to process the entire dynamic segment in one communication cycle by software, it may be processed by reflecting preferential usage request information obtained in the current communication cycle in a subsequent communication cycle. Therefore, its flexibility is high.

Figure 10A:
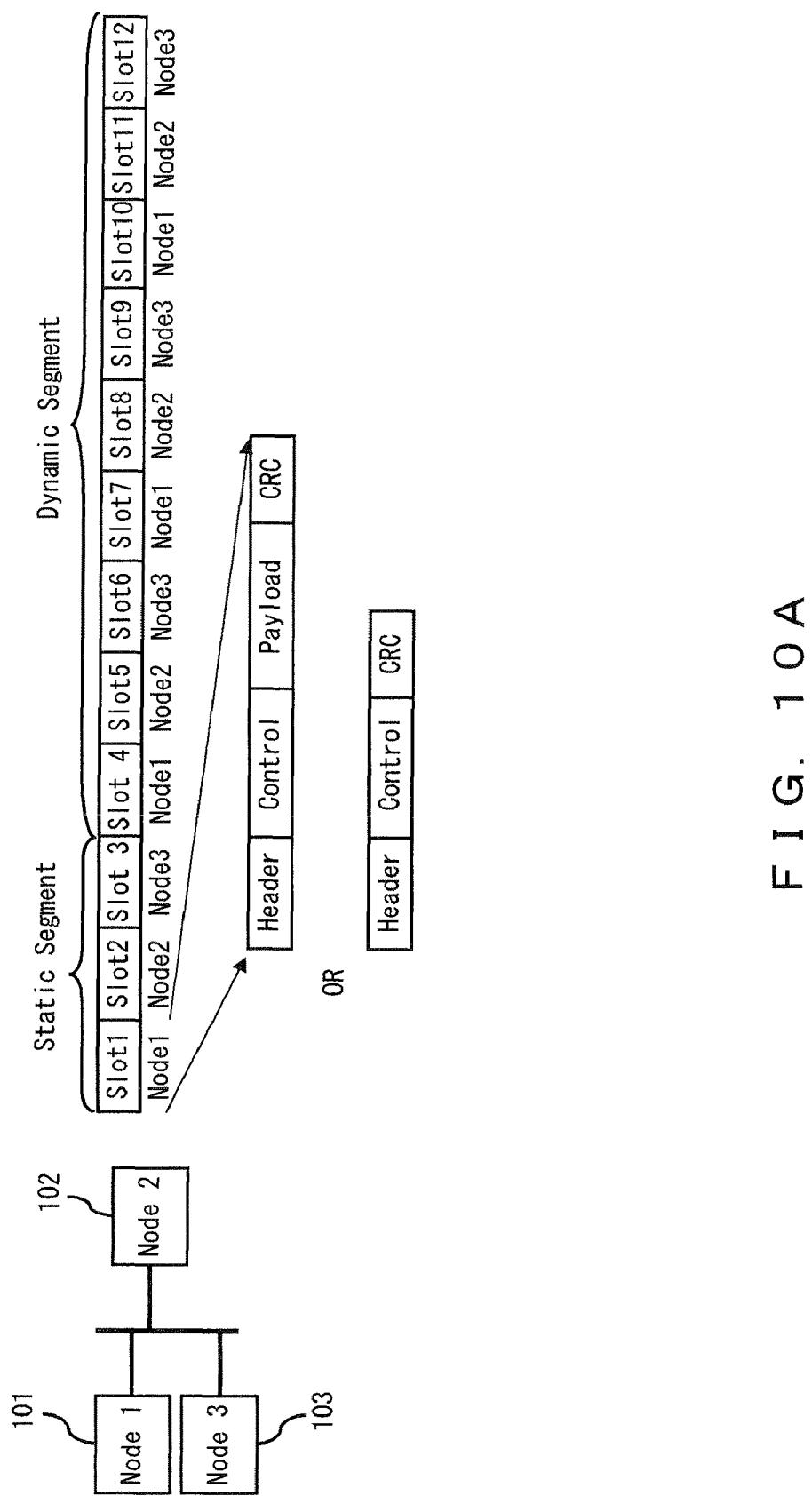
FIG. 10A explains a case where the first structure example of a control field is adopted in the first embodiment.

FIG. 10A explains a case where the first structure example of a control field is adopted in the first embodiment. The case is described using a cluster in which nodes 1 (101), 2 (102) and 3 (103) are connected by a bus as an example.

When it is explained using examples, it is assumed that they have the similar cluster structure.

In the first structure example of a control field, a control field is included in a frame which is transferred in a static slot. There are two types of the frame which may be transmitted in a slot transmitting a control field. They are a frame in which payload is transmitted together with control information and a frame in which only control information is transmitted as illustrated. Although in the illustrated example, there are only three static slots being the similar number as the nodes, the number may be also more.

Each node transmits preferential usage request information using a static slot. Then, the receiving side obtains all the pieces of preferential usage request information and controls a preferential usage request.

Figure 10B:
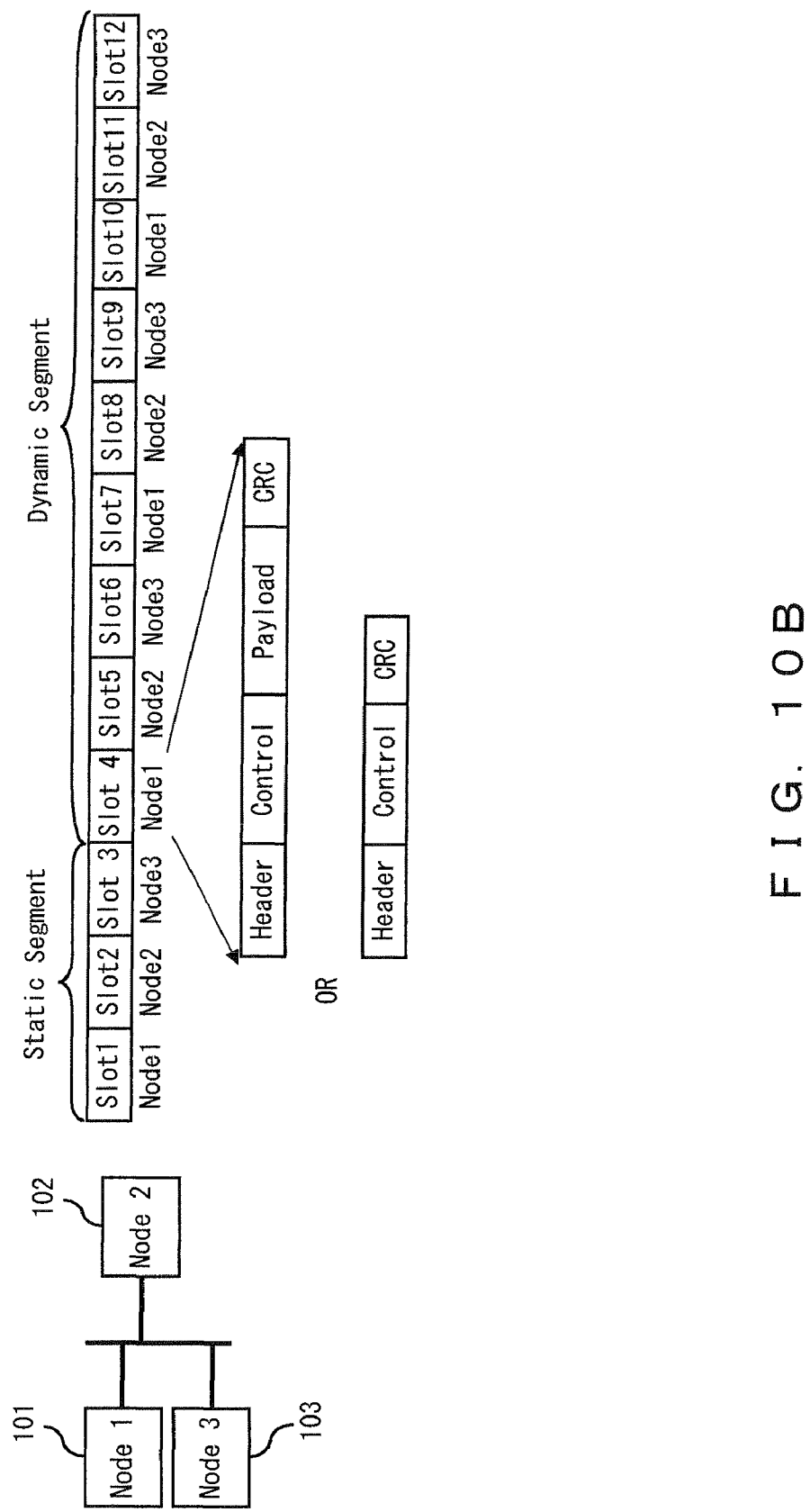
FIG. 10B explains a case where the second structure example of a control field is adopted in the first embodiment.

FIG. 10B explains a case where the second structure example of a control field is adopted in the first embodiment.

In the second structure example of a control field, a control field is included in frames which are transferred by slots of the number of nodes from the head of the dynamic segment. In the illustrated example, since the cluster is composed of three nodes, the first three slots of the dynamic segment are assigned as slots for frames transmitting control fields. Each node transmits preferential usage request information in these assigned slots. In this case, as in the first structure example, payload may be also transmitted in the assigned slots together. As in the first structure example, the receiving side obtains all the pieces of preferential usage request information and controls a preferential usage request.

Next, a priority determination method using the preferential usage request information obtained on the receiving side in the first embodiment is described in detail. As described earlier, in the first embodiment, each receiving node buffers control field information in the frame transmitted from transmitting nodes requesting for preferential usage and collectively determines priority after obtaining all the pieces of preferential usage request information used for the dynamic segment in the communication cycle.

1. After obtaining all the pieces of control field information, the number (p) of preferential usage-requested slots is calculated.
2. Since the total number (total_dslot) of transmittable dynamic slots are already known, the number (np) of slots whose preferential usage is not requested may be obtained by the following expression 1, from the result of the above 1.

$$np = \text{total\_dslot} - p \quad \text{[Expression 1]}$$

3. The number of transmittable preferential slots (allow_p) and transmittable non-preferential slots (allow_np) may be obtained by the following expression 2.

$$\text{segment\_length} > (\text{allow\_}p + \text{allow\_}np) \times \text{slot\_length}, \quad \text{[Expression 2]}$$

wherein
segment_length: Dynamic segment length
allow_p: Number of transmittable preferential slots ($0 \leq \text{allow\_}p \leq p$)
allow_np: Number of transmittable non-preferential slots ($0 \leq \text{allow\_}np \leq np$)
slot_length: Dynamic slot length Each node calculates a band needed to transmit all the preferentially-requested slots on the basis of expression 2 to determine a transmitting dynamic slot. For that purpose, the following procedures are executed.

4. Firstly, allow_p is calculated.
If the following expression holds true, allow_p=p.

$$\text{segment\_length} > p \times \text{slot\_length} \quad \text{[Expression 3]}$$

Then, as illustrated in 5 below, allow_np is calculated as the maximum value satisfying expression 2.

If [Expression 3] does not hold true, allow_p is calculated by the following expression.

$$\text{allow\_}p = \text{segment\_length}/\text{slot\_length} \text{ (The fractional portion of the number is dropped)} \quad \text{[Expression 4]}$$

In this case, no transmittable non-preferential slot is assigned and it is used to select a transmittable slot from the requested preferential slots.

Since the smaller is a slot number, the higher is priority, transmittable slots are selected according to the ID of requested preferential slots.

5. If expression 3 holds true, allow_p is calculated as follows.
The following expression may be developed from expression 2.

$$\text{allow\_}np = \text{segment\_length}/\text{slot\_length} - \text{allow\_}p \text{ (the fractional portion of the number is dropped)} \quad \text{[Expression 5]}$$

A transmittable non-preferential slot may be determined according to expression 5 and since the smaller is a slot number, the higher is priority, transmittable slots are assigned according to their slot ID.

6. Each transmitting node determines whether to transmit according to this assigned transmittable slot.

The above-described procedures are applied when their slot_length may be the same. When data length (slot length), which will be described later is also reported in the control field, transmittable slots are calculated in such a way that the accumulated sum of the individual slot length of each slot may satisfy each of the above-described expressions.

When there is a plurality of preferential usage request levels, which will be described later, a transmittable slot is determined in descending order of priority level, in the similar way as a transmittable slot is determined in order from preferential slots to non-preferential slots.

When the second structure example in which preferential usage request information is transmitted/received in the dynamic segment is adopted as the structure of the control field, it is used to perform a process by subtracting a time of slots needed to transmit/receive preferential usage request information from the dynamic segment time.

Figure 11:
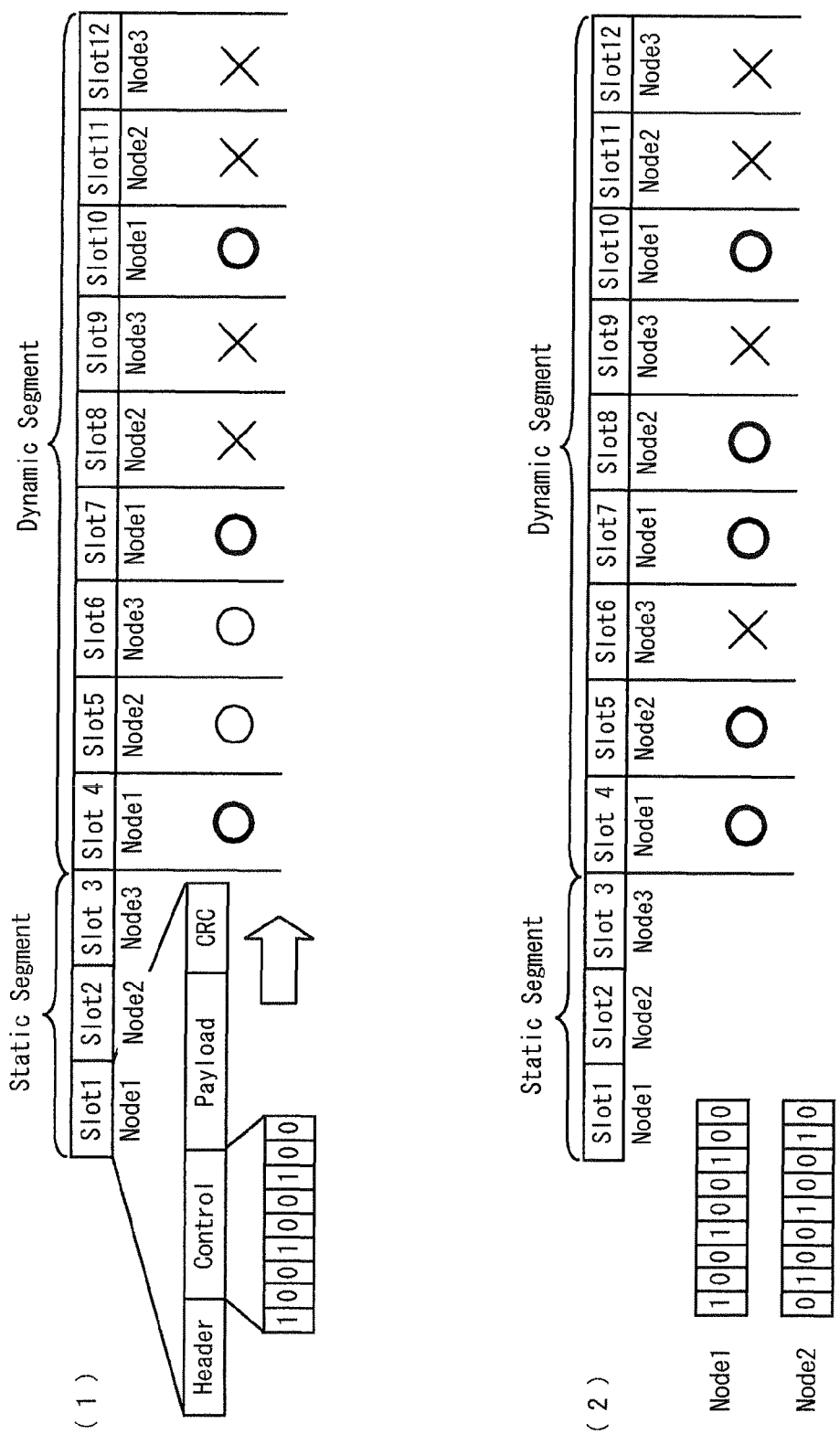
FIG. 11 explains the example determination of a transmittable dynamic slot in the case where one-bit priority information is used in the first embodiment.

FIG. 11 explains the example determination of a transmittable dynamic slot in the case where one-bit priority information is used in the first embodiment, For example, preferential/non-preferential information is defined using one bit for each dynamic slot in control information. Although in the illustrated example, the control field is that of the first structure example and included in the static slot, the similar also applies to the second structure example.

In the illustrated example (1), only node 1 (101) requests for the preferential usage of the slots 4, 7 and 10 of the dynamic segment in the control field of a frame transmitted in a static slot 1.

In the illustrated example (1), the transmittable dynamic slots of node 1 (101) are slots 4, 7 and 10, the transmittable dynamic slots of node 2 (102) are slots 5, 8 and 11, and the transmittable dynamic slots of node 3 (103) are slots 6, 9 and 12. Furthermore, in that case, its dynamic segment time (segment_length) is the maximum slot length (slot_length) in the cluster×five slots.

When the preferential usage of three slots in total are requested as in the illustrated example (1), they are less than five slots. Therefore, two slots can be assigned as non-preferential slots.

Therefore, although transmission using slots 5 and 6 of smaller numbers may be possible, nodes corresponding to slots 8, 9, 11 and 12 cancel transmission in those slots (In the figure, nodes 2 (102) and 3 (103)).

In the illustrated example (2), in addition to node 1 (101), node 2 (102) requests for the preferential usage of slots 5, 8 and 11. When the preferential usage of six lots in total are requested, one request may not be transmitted since the number in total of transmittable slots is five. In this case, transmission by a slot with ID of a larger slot number is cancelled. In the figure, it is slot 11. In this case, the number of transmittable slots as non-preferential slots is 0.

FIG. 12 illustrates one example transmitting process flow of a dynamic slot in the case where one-bit priority information is used in the first embodiment. It is assumed that the control field is set in a static slot.

Firstly, in operation S10, a static slot n is received. Then, in operation S11 control information is obtained from the static slot n received in operation S10. Then, in operation S12 it is determined whether the static segment is finished.

If it is not finished, the process returns to operation S10 and the process of a subsequent static slot is repeated. If it is finished, the process advances to operation S20.

In operation S20 the number of slots whose preferential usage is requested is calculated on the basis of the obtained control information. Then, in operation S21 transmittable preferential slots are determined on the basis of the number of slots whose preferential usage is requested calculated in operation S20, the number of transmittable slots in the dynamic segment and the ID numbers of the dynamic slots.

Then, in operation S22 it is determined whether there is a transmittable dynamic slot whose preferential usage is not requested on the basis of the comparison between the number of transmittable dynamic slots and the number of slots whose preferential usage is requested. If there is no transmittable slot, the process advances to operation S30. If there are transmittable slots, its number is calculated in operation S23.

Then, in operation S24 transmittable non-preferential slots are determined on the basis of the number of transmittable non-preferential slots calculated in operation S23 and the ID numbers of the dynamic slots.

Then, in operation S30 it is determined whether a dynamic slot k may be transmitted on the basis of the determination processes in operations S21 and S24.

If it may be transmitted, the process advances to operation S31. If it may not be transmitted, the process advances to operation S32.

In operation S31 dynamic slot k is transmitted. In operation S32 its transmission is cancelled by the bus transmitting/receiving control unit.

Then, in operation S33 it is determined whether the dynamic segment is finished.

If it is not finished yet, the process returns to operation S30 and the determination of a subsequent dynamic slot is repeated. If it is already finished, the process returns to operation S10 and the process in a subsequent communication cycle is performed.

The processes in operations S10 through S12 illustrated in FIG. 12 are processes in the static segment and correspond to the processes of slots 1 through 3 in FIG. 11. The processes in operations S30 through S33 are processes in the dynamic segment. Processes in operations S20 through S24 are processes between the segments.

FIG. 13 explains the example determination of a transmittable dynamic slot in the case where priority information of a plurality of bits is used in the first embodiment.

FIG. 13 exemplifies a case where two-bit control information is used, in which "11" has top priority and after that, priority decreases in order of "10", "01" and "00".

Although there is no need to change the calculation method of priority determination, transmittability is determined in descending order from top priority.

In the illustrated example, node 1 (101) issues a request "01" for slot 7, node 2 (102) issues a request "10" for slots 2 and 8, and a request "01" for slot 11, and node 3 (103) issues requests "11" for slots 3 and 12. Then, firstly, slots marked with an illustrated double circle are determined to be transmittable, then slots marked with a single circle are determined to be transmittable, then slots marked with a black circle are determined to be transmittable and lastly, a slot marked with a triangle is determined to be transmittable.

In this example, since seven slots may transmit in the dynamic segment, of non-preferential slots, slot 1 may transmit but slots 9 and 10 may not transmit.

Figure 14:
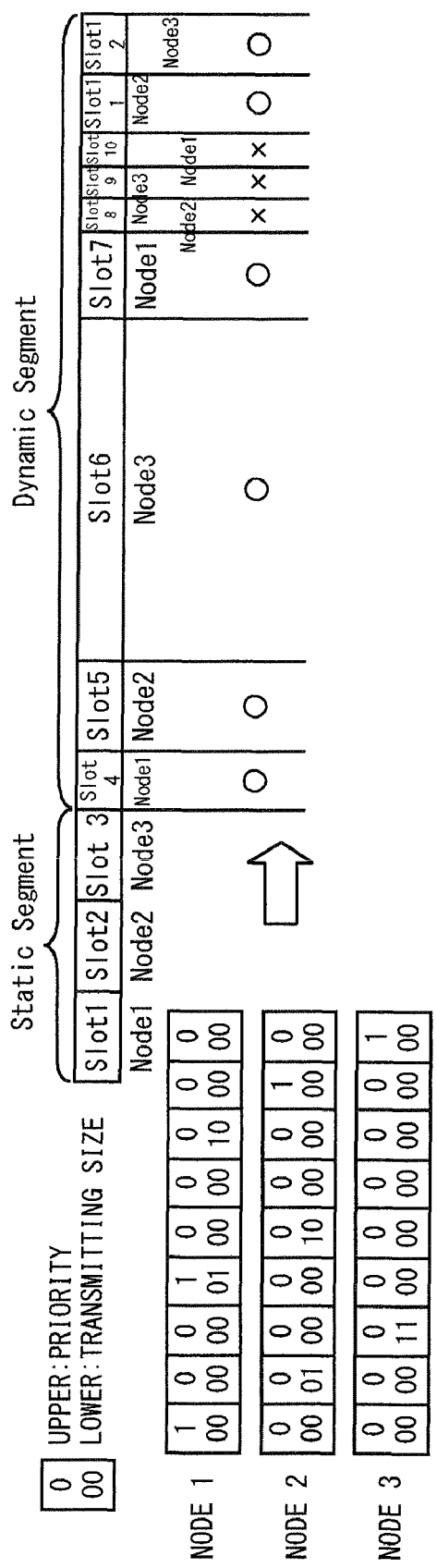
FIG. 14 explains the example determination of a transmittable dynamic slot in the case where priority information and the number of transmitting bytes are used in the first embodiment.

FIG. 14 explains the example determination of a transmittable dynamic slot in the case where priority information and the number of transmitting bytes are used in the first embodiment.

Since in the permit determination of preferential usage, the length of a frame transmitted by each dynamic slot is variable, it is used to take its band in use into consideration. However, when the band in use is unknown, there is no other way than to determine permit using the maximum possible frame length in the system as the length of a frame transmitted by the dynamic slot.

However, when determining to assign preferential slot using the maximum frame length of a dynamic slot, an excessive band more than actually needed is assigned. Therefore, there is a possibility that a dynamic frame which may be essentially transmitted may not be transmitted due to the shortage of a band.

Therefore, a method for preventing an excessive band from being assigned is illustrated in FIG. 14, in which the data size information about each dynamic slot is added to preferential usage request information for each dynamic slot. Thus, since only a used band is assigned to a preferentially-requested slot, a band may be effectively used.

In the illustrated example, priority information and transmitting size are expressed by one and two bits, respectively. A used band may be somewhat known by a small number of bits by classifying data size, for example, into "00", "01", "10" and "11" for 32 bits or less, 64 bits or less, 128 bits or less and 256 bits or less, respectively. Thus, data size may be easily determined.

The band of each slot is sequentially assigned in descending order of priority according to transmitting size. When all the slots may not be transmitted with the transmittable size of the dynamic segment, the transmission of slots is cancelled in ascending order of priority and in descending order of frame ID number. The determination process is performed until the band reaches to the maximum possible transmittable size.

In the illustrated example, preferential usage requests for slots 4 and 7 are issued from node 1, for slot 11 from node 2 and for slot 12 from node 3. As to the transmitting sizes of slots whose preferential usage is requested, that of slot 4 is 32 bits, that of slot 7 is 64 bits and each of those of slots 11 and 12 is 32 bits, which is 160 bits in total. However, as to the transmitting sizes of non-preferential slots, that of slot 5 is 64 bits, that of slot 6 is 256 bits, that of slot 8 is 128 bits, that of slot 9 is 32 bits and that of slot 10 is 128 bits, which is 608 bits in total.

The total of the transmitting sizes of preferential and non-preferential slots is 768 bits. When the maximum possible transmittable size of the entire dynamic segment is, for example, 600 bits, all the slots may not be transmitted.

Then, the transmission of slot 10 having a transmitting size of 128 bits which is non-preferential and whose ID number is the largest is first cancelled and after that, transmission continues to be cancelled until all the slots may be transmitted, in descending order of ID number. Then, as illustrated, slots 9 and 8 may not also be transmitted.

As described in FIG. 13, when priority information is given by a plurality of bits too, as described above, control by transmitting size may be clearly possible.

Second Embodiment

Next, as the second embodiment, an aspect for classifying dynamic slots into groups at certain time intervals and determining slots transmittable as a group is described.

As earlier described, although according to the specification of FlexRay, slots having smaller slot ID are transmitted with priority, in the second embodiment, priority based on the existing slot ID (whose preferential usage is not requested) is also added to the priority usage request.

When determining the transmittability as a group of the dynamic segment in one communication cycle, arbitrarily grouped, instead of collectively determining it, priority is controlled in units of group. Therefore, priority control close to the essential specification that the smaller is a slot number, the higher is priority, may become possible (it means that non-preferential slots having small ID are also transmitted).

Since it is determined in units of group on the basis of the remaining time of the dynamic segment, a band may be effectively and efficiently used including non-preferential slots.

Figure 15:
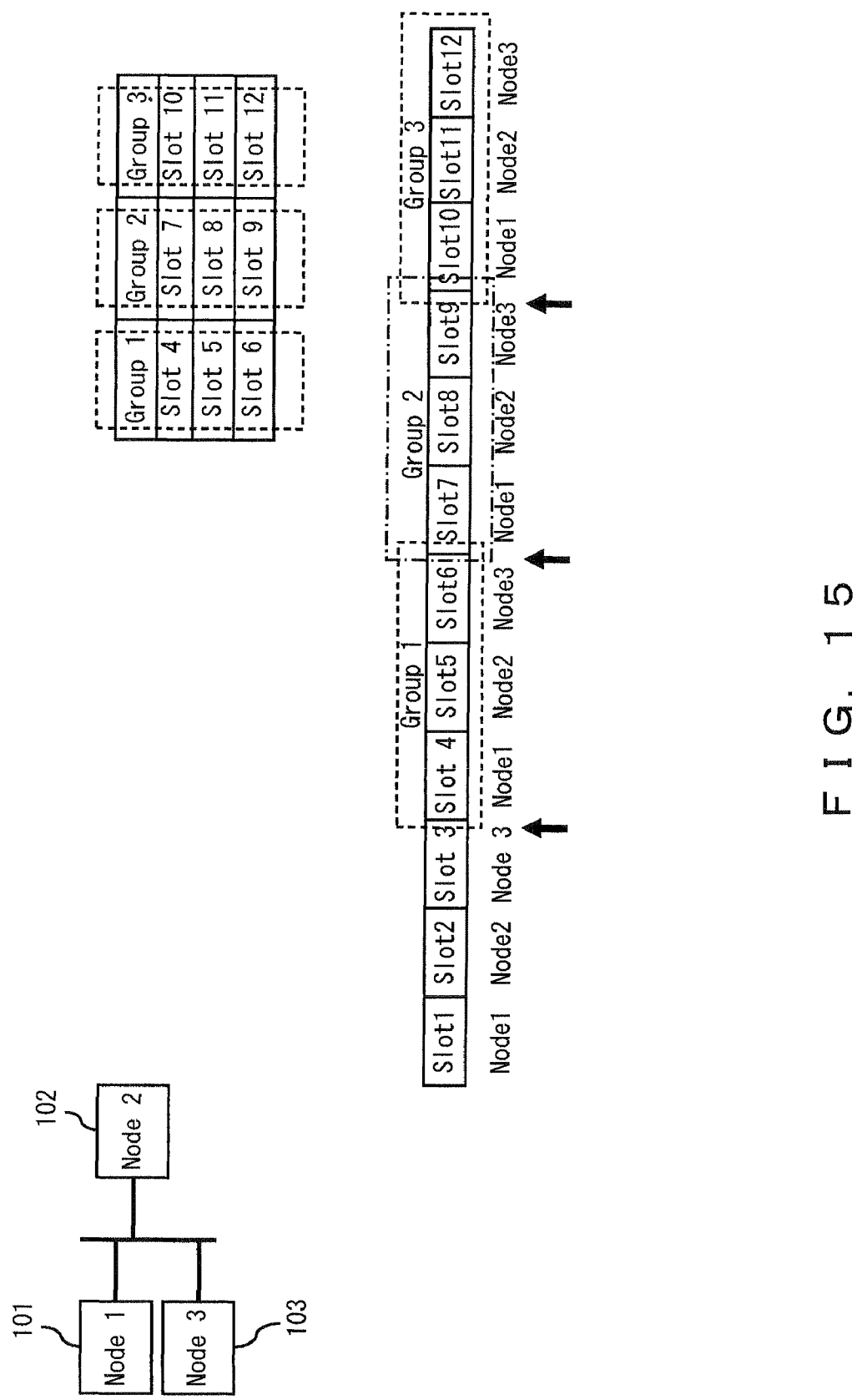
FIG. 15 explains the second embodiment.

FIG. 15 explains the second embodiment. Its cluster structure is the similar as illustrated in FIG. 10A. As to its group classification, it is assumed that slots 4 through 6, slots 7 through 9 and slots 10 through 12 are groups 1, 2 and 3, respectively. In the second embodiment, for example, transmitting slots are determined for each of the groups 1 through 3.

It is used to determine transmitting slots before the leading slot of each of the groups 1 through 3 being the timing of the illustrated arrows. In that case, the remaining time of dynamic segment transmission is taken into consideration. Although, for example, for the determination of the transmitting slot of group 1 at the timing of the first arrow, the time of the entire dynamic segment may be used, for the determination of the transmitting slot of group 2 at the timing of the second arrow, only the remaining time excluding the time used for group 1 may be used.

Therefore, transmitting slots are determined giving more emphasis on priority due to a slot ID than in the first embodiment.

As in the first embodiment, for a control field for exchanging preferential usage request information, either static frames or the leading slots (of the number of nodes) of the dynamic segment may be used.

Then, the method for obtaining the received preferential usage request information and determining transmittable slots is described in detail. As described earlier, in the second embodiment, the dynamic slots of the dynamic segment are divided into a plurality of groups and transmittable slots are determined from a group including a smaller slot ID.

7. A plurality of dynamic slots is divided into groups in advance and the number of preferential usage-requested slots ($p\_n$) is calculated for each group. The arbitrary number of ID is grouped in continuous order of ID number.

8. The number ($np\_n$) of slots whose preferential usage is not requested is calculated for each group by the following expression 6 on the basis of the known number ($group\_d\_slot\_n$) of transmittable dynamic slots in a group and the result of the above 7.

$$np\_n = group\_d\text{slot}\_n - p\_n \quad (n: \text{group number}) \qquad \text{[Expression 6]}$$

9. According to the following expression 7, the number ($allow\_p\_n$) of transmittable preferential slots and the number ($allow\_np\_n$) of transmittable non-preferential slots are calculated for each group from the leading group.

$$segment\_length - r\_segment\_length > (allow\_p\_n + allow\_np\_n) \times slot\_length, \qquad \text{[Expression 7]}$$

wherein
segment_length: dynamic segment length
r_segment length: total length of assigned dynamic segment
allow_p_n: number of transmittable preferential slots ($0 \leq allow\_p\_n \leq p\_n$)
allow_np_n: number of transmittable non-preferential slots ($0 \leq allow\_np\_n \leq np\_n$)
slot_length: dynamic slot length
(n: group number)

Total length of assigned dynamic segment r_segment_length may be calculated by the following expression 8.

$$r\_segment\_length = \sum_{i}^{n-1}((allow\_p\_i + allow\_np\_i) \times slot\_length) \qquad \text{[Expression 8]}$$

(in the case where the n-th group is calculated)

Each node calculates a band needed to transmit the preferentially-requested slots for each group on the basis of expression 7 and determines transmittable dynamic slots.

This band assignment for each group is performed until the entire transmittable band in the dynamic segment is used.

For that purpose, the determination for each group is performed in the following procedures.

10. Firstly, the number $allow\_p\_n$ of transmittable preferential slots is calculated.

If the following expression holds true, $allow\_p\_n = p\_n$.

$$segment\_length - r\_segment\_length > p\_n \times slot\_length \qquad \text{[Expression 9]}$$

Then, as described in the 11 below, the number $allow\_np\_n$ of transmittable non-preferential slots is calculated.

When expression 9 does not hold true, $allow\_p\_n$ is calculated by the following expression.

$$segment\_length - r\_segment\text{-}length = allow\_p\_n \times slot\_length$$

$$allow\_p\_n = (segment\_length - r\_segment\text{-}length) / slot\_length \qquad \text{[Expression 10]}$$

(The fractional portion of the number is dropped)

When expression 9 does not hold true and the number of transmittable preferential slots is calculated according to expression 10, no transmittable non-preferential slot is assigned and it is used to select transmittable slots from the requested preferential slots.

In this case, since the smaller is a slot number, the higher is priority, a transmittable slot is determined according to its slot ID.

11. When expression 9 holds true, $allow\_np\_n$ is calculated as follows.

The following expression may be developed from expression 7.

$$allow\_np\_n = (segment\_length - r\_segment\text{-}length) / slot\_length - allow\_p\_n \qquad \text{[Expression 11]}$$

(The fractional portion of the number is dropped)

According to expression 11, the number of transmittable non-preferential slots is determined. Then, since the smaller is a slot number, the higher is priority, transmittable slots are assigned according to a slot ID.

12. When there still remains the dynamic segment time after the process in the above 11, a subsequent group is processed.

13. Each transmitting node determines the transmission/non-transmission of these assigned transmittable slots.

The above-described procedures apply to a case where slot_length may be the same. When data length (slot length) is also reported in the control field, as in the first embodiment, transmittable slots may be obtained by controlling in such a way that the accumulated sum of the length of each slot may satisfy each of the above-described expressions.

As in the first embodiment, a plurality of preferential usage request levels are provided, as in the similar way as transmittable slots are determined in the above-described order of preferential to non-preferential, transmittable slots are determined in descending order of priority level.

Furthermore, the second structure example in which preferential usage request information is transmitted/received by a dynamic segment is adopted as the structure of a control field, as in the first embodiment, it is used to perform a process by subtracting a time of slots needed to transmit/receive preferential usage request information from the dynamic segment time.

Figure 16:
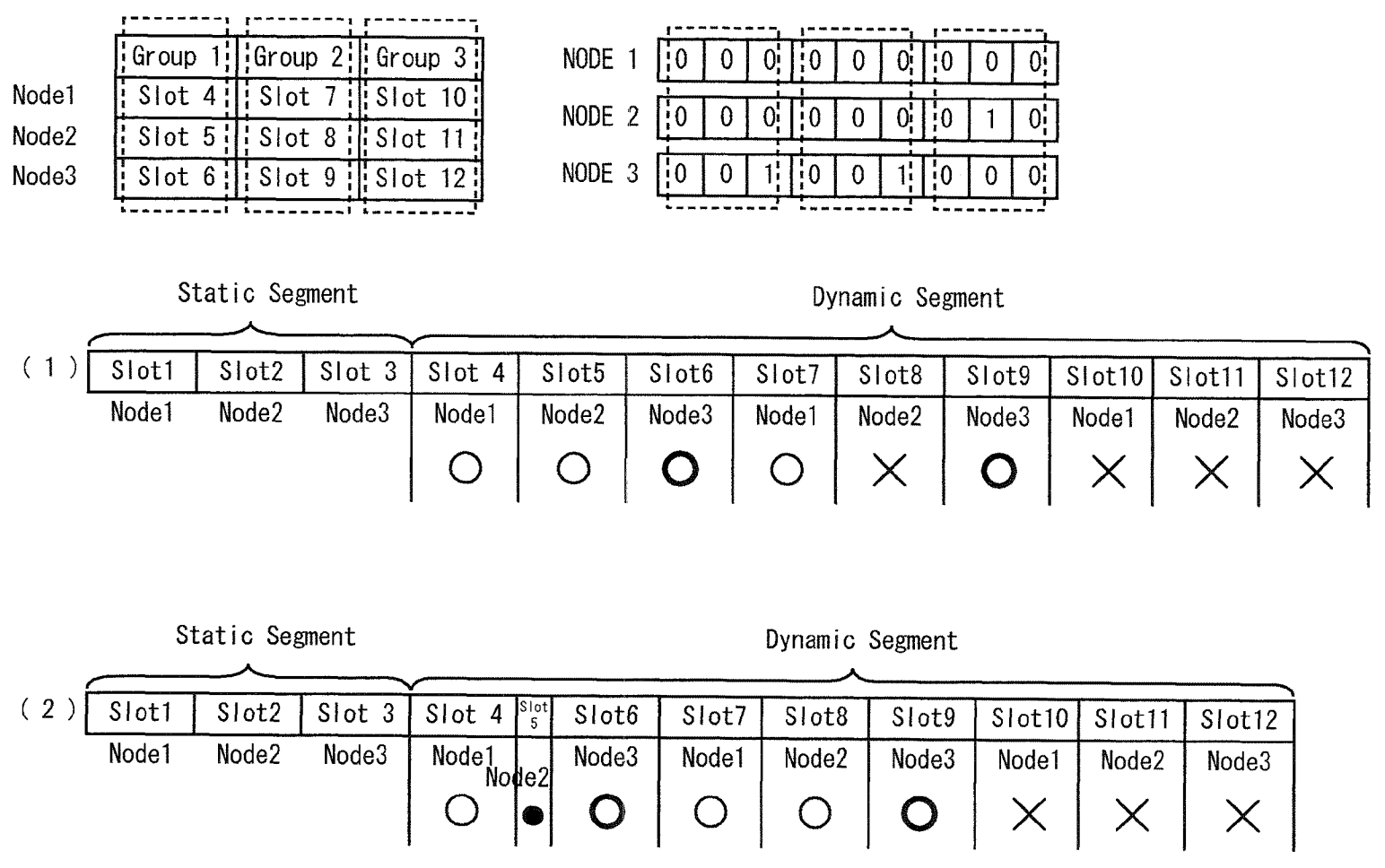

FIG. 16 explains the example determination of transmittable dynamic slots in the case where priority is determined for each group using one-bit priority information in the second embodiment. Since priority is determined for each group, it is used to perform the priority determination process before the head of each group.

The cluster exemplified in FIG. 16 is the similar as exemplified in FIG. 15. As illustrated, it is assumed that a preferential usage request for slot 11 is issued from node 2 and for slots 6 and 9 from node 3.

(1) and (2) of FIG. 16 are the example determination results of transmittable dynamic slots. In the exemplified cluster, it is assumed that five slots may be transmitted in the maximum frame length.

Since in the second embodiment, transmittable slots are determined for each group and in the example of FIG. 16, priority is determined for each group, firstly it is determined whether there is a slot whose preferential usage is requested in group 1. Since node 3 requests for the preferential usage of slot 6, the transmission of slot 6 is first determined.

Then, the number of the remaining transmittable slots becomes four and slots 1 and 2 being the remaining slots in group 1 are sequentially determined as transmittable slots. Then, the number of the remaining transmittable slots becomes two.

It is used to perform the above-described determination process of group 1 before slot 4 starts. As described above, in this case the determination is performed assuming that the entire dynamic segment time may be used. When five slots may be transmitted in the maximum frame length in this cluster, in group 1, the transmission of three slots including non-preferential slots is permitted.

Then, before slot 7 where group 2 starts, slots in group 2 are determined. In this case, a time used to determine priority is the remaining time of the dynamic segment excluding the time actually used for group 1.

(1) of FIG. 16 is the case where all the slots in group 1 are transmitted. In group 2, since node 3 requests for the preferential usage of slot 9, the transmission of slot 9 is first determined. The number of the remaining transmittable slots becomes one and slot 7 whose slot ID is the smallest of the remaining slots in group 2 is determined to be transmittable.

Since the remaining slots to be transmitted become few, the transmission of slot 11 in group 3, whose preferential usage is requested by node 3 is cancelled.

In (2) of FIG. 16, although the transmission of slot 5 is permitted, in node 2 it is not transmitted since there is no transmitting request. Therefore, the remaining time increases by a time of slot 5. The determination of transmittable slots in group 2 is performed on the basis of the actually increased time. Therefore, in group 2, three slots including non-preferential slots may be permitted.

Although in the above description, it is assumed that dynamic slots being the control targets of a preferential usage request are in the similar communication cycle, they are determined as in (1) of FIG. 16 if they are in a subsequent communication cycle. (2) of FIG. 16 is an example in which transmittable dynamic slots are changed after their transmission is actually started in the dynamic segment in which transmittable slots are determined as in (1) of FIG. 16. Each node monitors whether each of the slots whose transmission is permitted is actually transmitted. Therefore, when it is detected that slot 5 in group 1, whose transmission is permitted, has not been transmitted, transmitting permit is re-assigned to a slot in a subsequent group and the transmission of slot 8 is permitted.

In priority determination in group 3, if five slots are already transmitted, the remaining time runs short and even when preferential usage is requested, transmitting permit may not be given.

However, since time used for priority determination in the above-described priority determination process is the remaining time that may be actually used, there is a possibility that the band may also be used for group 3 when there is a slot that is not transmitted regardless of its transmitting permit.

For example, although in FIG. 16 it is assumed that all the nodes whose transmission is permitted transmit in the maximum frame length of this cluster, some node transmits a shorter frame than the maximum frame length. Therefore, in that case, the remaining time in group 3 increases and there is a high possibility that transmitting permit may be given.

Third Embodiment

Even when dynamic slots are grouped at certain time intervals, transmittable slots are determined for each group and the transmission of as many low-priority slots having a small ID number as possible may be requested, sometimes such more complex priority control that is requested to perform in the entire dynamic segment time is requested.

As the third embodiment, an aspect for determining preferential usage requests in the entire dynamic segment, securing a band in advance for the preferential usage requests and determining for each group using the remaining band for slots for non-preferential usage is described below.

In the third embodiment too, an individual slot length where control information includes the number of transmitting bytes may be used as in the first and second embodiments. Furthermore, when a plurality of preferential usage request levels are provided, as in the first and second embodiments, a band to be used may be determined in descending order of priority level like from preferential slots to non-preferential slots.

According to the third embodiment, since transmittable slots are determined for each group, priority control close to the essential specification that the smaller is a slot number, the higher is priority, may become possible (it means that non-preferential slots having small slot ID are also transmitted). Furthermore, priority control in which even a low-priority slot having a large slot ID may be always transmitted may become possible, thereby enabling finer control.

Furthermore, since control is performed for each group on the basis of the remaining dynamic segment time, a band may be effectively and efficiently used including non-preferential slots.

Figure 17:
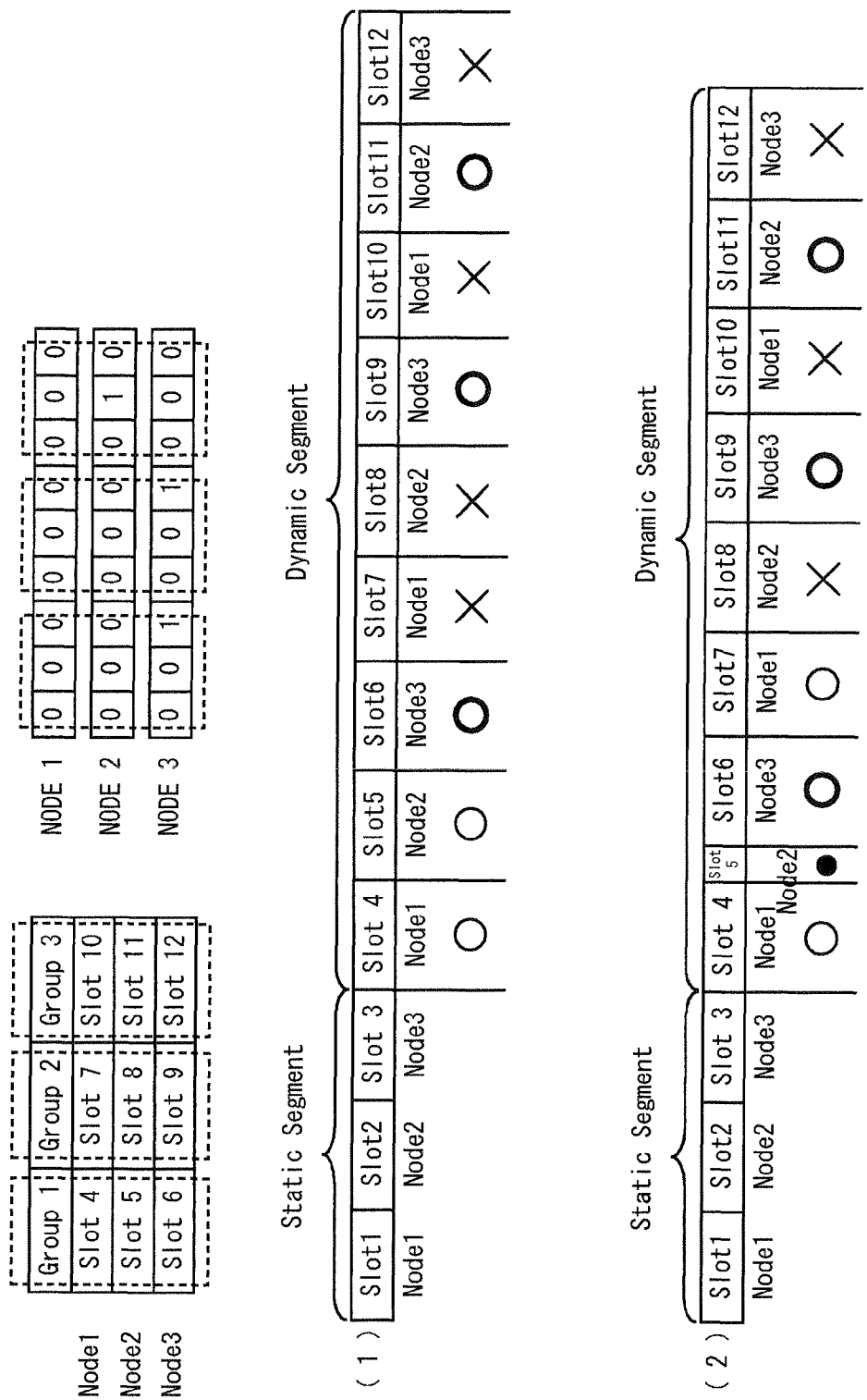
FIG. 17 explains the example determination of transmittable dynamic slots in the case where one-bit priority information is used in the third embodiment.

FIG. 17 explains the example determination of transmittable dynamic slots in the case where priority is determined for each group using one-bit priority information in the third embodiment. Its cluster structure and a priority usage request are the similar as those exemplified in FIG. 16.

Firstly, priority usage requests are processed. In the illustrated example, since preferential usage request targets are slots 6, 9 and 11, their transmitting permit is determined.

Then, the transmission determination of group 1 is performed. It is used to determine before slot 4 starts. When five slots may be transmitted in the maximum frame length of this cluster, since the transmission of three preferential usage slots has been already permitted, the transmitting permit of the remaining two slots may be determined. Therefore, slots 4 and 5 being the remaining slots in group 1 are sequentially determined to be transmittable. After all, the transmission of three slots is permitted in group 1.

Then, in group 2, when all the slots in group 1 are transmitted, the remaining time is only for preferential slots. Therefore, the transmission of only slot 9 being a preferential usage slot is permitted.

Furthermore, in group 3, since as in group 2, the remaining time is only for preferential slots, the transmission of only slot 11 being a preferential usage slot is permitted.

Thus, the determination result illustrated in (1) of FIG. 17 is obtained.

However, since as described in FIG. 16, the determination is performed before each group starts using the actual remaining time, slot 5 whose transmission is permitted may not be actually transmitted since there is no transmitting request in node 2. In that case, as illustrated in (2) of FIG. 17, in group 2 transmitting permit may be given to slot 7.

Although in FIG. 17 the description is made presuming a frame in the maximum frame length, when considering a frame in an actual frame length, the remaining time increases and there increases a possibility that transmission may be permitted as in FIG. 16. Besides, FIG. 17 is the similar as FIG. 16 except for that priority is determined in the entire dynamic segment.

Figure 18:
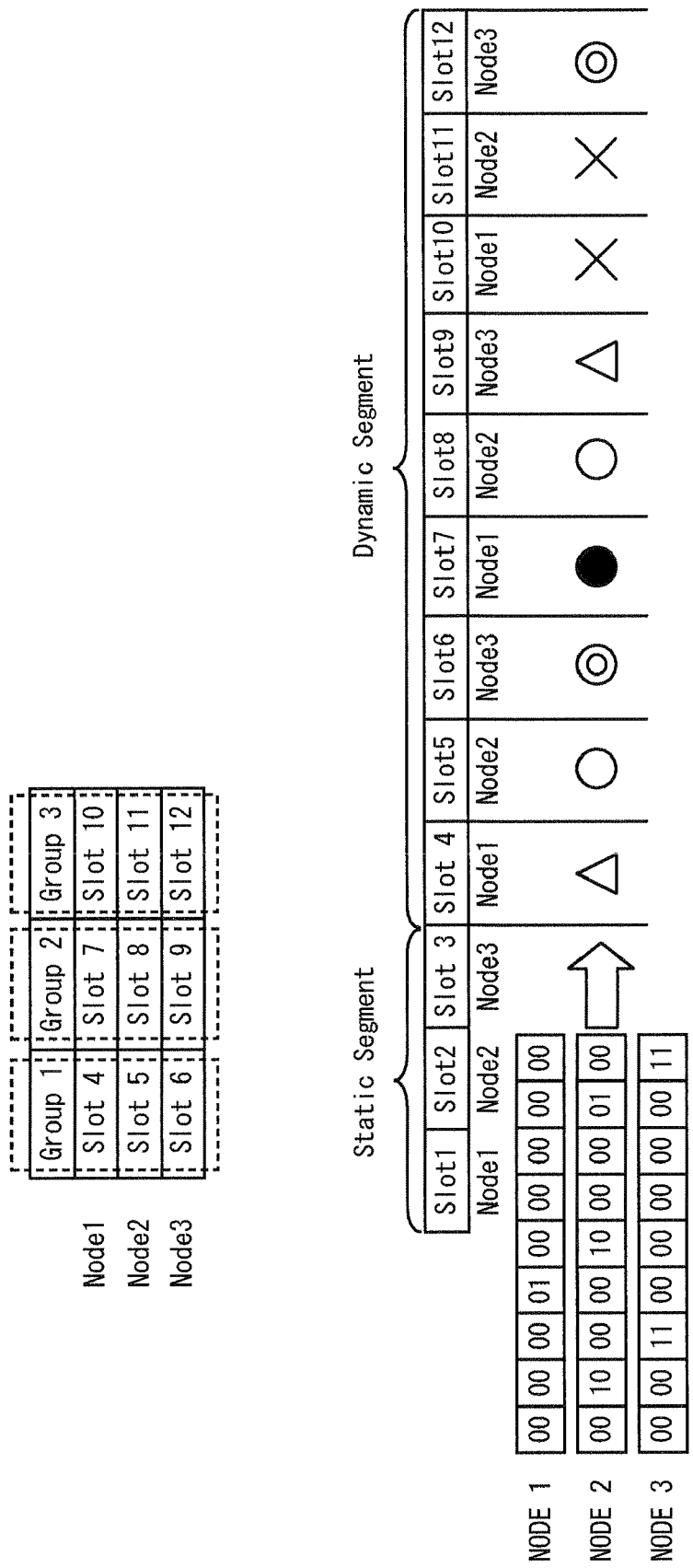
FIG. 18 explains the example determination of transmittable dynamic slots in the case where two-bit priority information is used and priority is determined for preferential requests with the top priority and the second priority in the entire dynamic segment in the third embodiment.

FIG. 18 explains the example determination of transmittable dynamic slots in the case where preferential requests with top priority and the second priority are determined in the entire dynamic segment, using a plurality of bits (two bits) of priority information in the third embodiment.

As illustrated in FIG. 13, in FIG. 18 control information is composed of two bits and "11" has top priority, and after that, priority drops in order of "10", "01" and "00".

Its cluster structure, priority information and the fact that seven slots may be transmitted in the maximum frame length are the similar as those illustrated in FIG. 13.

Firstly, slots 6 and 12 which are marked with illustrated double circles and whose usage is requested with top priority are determined to be transmittable. Then, slots 5 and 8 which are marked with single circles and whose usage is requested with the second priority are determined to be transmittable.

Slots whose usage is requested with the third priority and after are determined for each group. For example, they are determined by the similar method as illustrated in FIG. 16.

Since four slots are already determined to be transmittable and there still remain three slots, the remaining slot 4 is determined to be transmittable in group 1. Furthermore, since there still remain two slots, slot 7 in group 2 which is marked with a black circle and whose priority is "01" is determined to be transmittable. Then, slot 9 which is marked with a triangle and whose priority is "00" is determined to be transmittable.

Although in the above description, preferential requests with top priority and the second priority are determined in the entire dynamic segment, preferential requests may also be determined in another priority combination than it in the entire dynamic segment.

In FIG. 18 too, since determination for each group is performed on the basis of the actual remaining time, non-preferential usage slots may be also effectively and efficiently transmitted.

Figure 19:
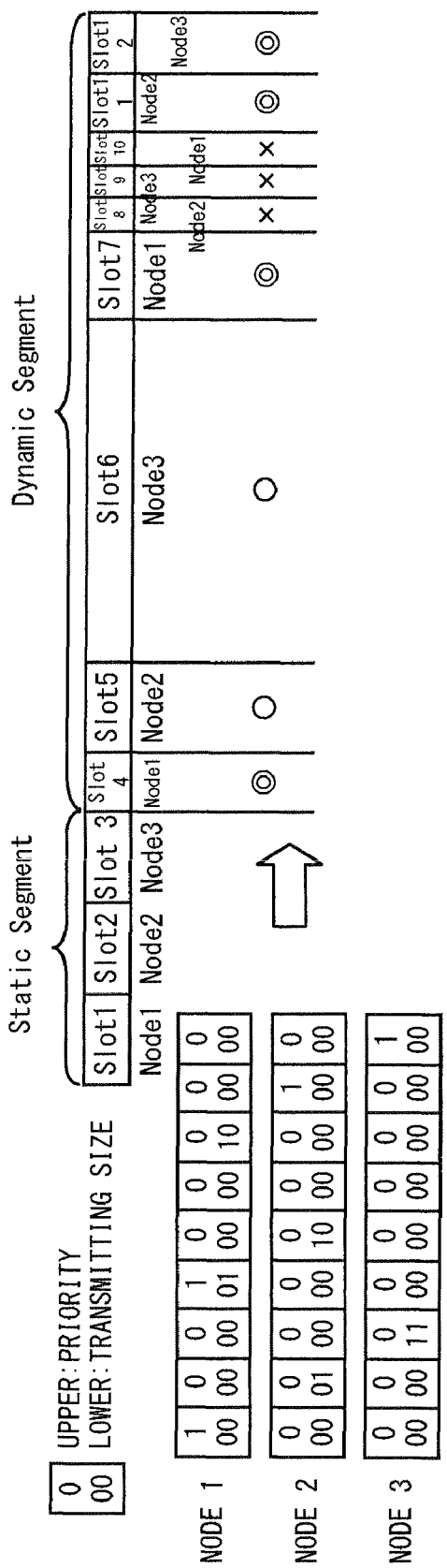
FIG. 19 explains the example determination of transmittable dynamic slots in the case where priority information and the number of transmitting bytes are used in the third embodiment.

FIG. 19 explains the example determination of transmittable dynamic slots in the case where priority information and the number of transmitting bytes are used in the third embodiment. Its cluster structure, priority information, transmitting byte number information and a size of 600 bytes transmittable in the entire dynamic segment are the similar as exemplified in FIG. 14. Priority determination control is collectively applied to the entire dynamic segment.

Firstly, a band is assigned to slots in descending order of priority according to their transmitting sizes. In the illustrate example, since the preferential usage of slots 4, 7, 11 and 12 marked with double circles is requested, the number of transmitting bytes of each slot continues to be added while checking the sum in such a way as not to exceed the maximum size of 600 bytes. Then, the total size of preferentially requested slots becomes 160 bytes, which is less than 600 bytes.

Then, transmittable non-preferential slots are assigned for each group.

In group 1, 64 bytes and 256 bytes are requested as the number of transmitting bytes of slots 5 and 6, respectively. When the 64 and 256 bytes are added to the 160 bytes, 480 bytes are obtained. Therefore, slots 5 and 6 marked with single circles are determined to be transmittable. In group 2 too, there may be a transmittable slot. However, since the number of transmitting bytes of slot 8 having a small ID number, of the non-preferential slots is 128, slot 8 may not be transmitted.

In FIG. 19 it is determined that slots 8 and after may not be transmitted. However, since the number of transmitting bytes of slot 9 is 32 in group 2, in such a case, it may be also determined to permit the transmission of slot 9. In other words, when there is a slot whose number of transmitting bytes is within the range of the number of the remaining bytes, after the slot that is determined to be non-transmittable due to its too large number of transmitting bytes, the transmission of the slot may also be determined to be transmittable.

As to a slot that is determined to be non-transmittable due to shortage of remaining number of transmitting bytes, like slot 8, the slot may also be transmitted after reducing its number of transmitting bytes, if it is appropriate.

Aforementioned embodiments may be to solve inequality in the transmission chance of a dynamic slot as requested and to provide a method for enabling a slot of a large ID number to be transmitted as much as a slot of a small ID number.

According to aforementioned embodiments, each node in the transmitting/receiving system may determine an actually transmittable dynamic slot in the same or a subsequent communication cycle, on the basis of the reported control information for the dynamic slot. Specifically, each node determines priority according to the control information of this preferential usage request. Then, when a band runs short, a transmitting node having a non-preferential slot stops transmitting a non-preferential frame and saves a band for a slot of a preferential request.

Thus, by using a preferential usage request, even a non-preferential slot of a large ID number may be surely transmitted. Therefore, according to the present embodiment, when it is used for each node to transmit in a dynamic segment, by using a preferential usage request for a dynamic slot, the frequency of the transmission completion of a dynamic slot may be preventing from decreasing because of a large ID number.

Aforementioned embodiment may be applied to a system communication, such as FlexRay which is promoted to standardize as a next generation car-mounted network communication method, featured by a flexible segment structure comprising a fixed area and a variable area, and relates to a transmitting/receiving system, a node and a communication method of the TDMA system communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A transmitting and receiving system comprising:
   a plurality of nodes configured to communicate with each other in accordance with communication cycles including a plurality of slots, at least one of the plurality of slots including a control field for controlling a transmitting priority of a dynamic slot,
   wherein at least one of the nodes is configured to set control information including a preferential usage request for the dynamic slot in which the at least one of the nodes transmits, in the control field and to notify the rest of the nodes of the control information including the preferential usage request for the dynamic slot, and
   wherein the control information set in the control field includes a plurality of bits corresponding to a plurality of dynamic slots, and the at least one of the nodes is configured to set one of the plurality of bits corresponding to the dynamic slot in which the at least one of the nodes transmits preferentially, to a certain value indicating a position of the dynamic slot in which the at least one of the nodes transmits preferentially.

2. The transmitting and receiving system according to claim 1, wherein
   the certain value indicates a preferential usage request for the dynamic slot in which the at least one of the nodes transmits preferentially.

3. The transmitting and receiving system according to claim 2, wherein
   a plurality of levels of priority are provided for the preferential usage request.

4. The transmitting and receiving system according to claim 1, wherein
   the control information in the control field includes size information of data to be transmitted in the dynamic slot.

5. The transmitting and receiving system according to claim 1, wherein
   the dynamic slots that all of the nodes transmit in a similar communication cycle are divided into a plurality of groups at certain time intervals and the dynamic slots in which data may be actually transmitted in the similar or a subsequent communication cycle are determined for each of the groups, according to the control information for the dynamic slots belonging to the group.

6. A node configured to communicate with other nodes in a transmitting and receiving system in accordance with communication cycles including a plurality of slots, at least one of the plurality of slots including a control field for controlling a transmitting priority of a dynamic slot, the node comprising:
   a control information transmitter configured to set control information including a preferential usage request for the dynamic slot in which the node transmits, in the control field and to transmit the control information including the preferential usage request for the dynamic slot to the other nodes; and
   a determiner configured to determine dynamic slots in which data may be actually transmitted in a similar or a subsequent communication cycle, according to the control information transmitted from the other nodes in a cluster in the similar communication cycle,
   wherein the control information set in the control field includes a plurality of bits corresponding to a plurality of dynamic slots, and the control information transmitter is configured to set one of the plurality of bits corresponding to the dynamic slot in which the node transmits preferentially to a certain value indicating a position of the dynamic slot in which the node transmits preferentially.

7. The node according to claim 6, wherein
   the certain value indicates a preferential usage request for the dynamic slot in which the node transmits preferentially.

8. The node according to claim 6, wherein
   the node is configured to store the control field in a static slot assigned to the node itself and to transmit the control field.

9. The node according to claim 6, wherein
   the node is configured to store the control field in a dynamic slot assigned to the node itself in a leading part of a dynamic segment including the plurality of dynamic slots and transmits the control field.

10. The node according to claim 6, wherein
    the node includes size information of data to be transmitted in the dynamic slot, in the control information in the control field.

11. The node according to claim 6, wherein
    the determiner is configured to determine dynamic slots in which data may be actually transmitted in a similar or a subsequent communication cycle, according to the control information set in all of the control fields in the similar communication cycle.

12. The node according to claim 6, wherein
    the determiner is configured to divide the dynamic slots in which the node and the other nodes may transmit in a similar communication cycle into a plurality of groups at certain time intervals and to determine the dynamic slots in which data may be actually transmitted in the similar or a subsequent communication cycle for each of the groups, according to the control information for the dynamic slots belonging to the group.

13. The node according to claim 12, wherein
    the determiner is configured to determine the dynamic slot in which the node may transmit according to an actual remaining time of a dynamic segment for each of the groups.

14. The node according to claim 12, wherein
    the determiner is configured to determine whether in the dynamic slots to be used preferentially data may be actually transmitted collectively in the similar or a subsequent communication cycle.

15. The node according to claim 14, wherein
    a plurality of levels of priority are provided for the preferential usage request, and
    the determiner is configured to determine whether in the dynamic slots to be used preferentially with up to a second priority data may be actually transmitted collectively in the similar or a subsequent communication cycle.

16. A communication method in a transmitting and receiving system including a plurality of nodes configured to communicate with each other in accordance with communication cycles including a plurality of slots, at least one of the plurality of slots including a control field for controlling a transmitting priority of a dynamic slot, the method comprising:
setting, by using at least one of the plurality of nodes, control information including a preferential usage request for the dynamic slot in which the at least one of the plurality of nodes transmits, in the control field;
notifying the rest of the nodes of the control information including the preferential usage request for the dynamic slot, the control information set in the control field including a plurality of bits corresponding to a plurality of dynamic slots in each communication cycle; and
setting, by using at least one of the plurality of nodes, one of the plurality of bits corresponding to the dynamic slot in which the node transmits preferentially to a certain value indicating a position of the dynamic slot in which the at least one of the plurality of nodes transmits preferentially.

17. The communication method according to claim 16, wherein
the certain value indicates a preferential usage request for the dynamic slot in which the node transmits preferentially.

18. The communication method according to claim 17, wherein
a plurality of levels of priority are provided for the preferential usage request.

19. The communication method according to claim 16, wherein
the control information in the control field includes size information of data to be transmitted in the dynamic slot.

20. The communication method according to claim 16, comprising:
dividing the dynamic slots in which all of the nodes may transmit in a similar communication cycle into a plurality of groups at certain time intervals; and
determining the dynamic slots in which data may be actually transmitted in the similar or a subsequent communication cycle are determined for each of the groups, according to the control information for the dynamic slots belonging to the group.

* * * * *